US008893259B2

(12) United States Patent
Agarwal et al.

(10) Patent No.: US 8,893,259 B2
(45) Date of Patent: *Nov. 18, 2014

(54) SYSTEMS AND METHODS FOR FINE GRAIN POLICY DRIVEN CLIENTLESS SSL VPN ACCESS

(75) Inventors: Puneet Agarwal, Bangalore (IN); Saibal Kumar Adhya, Bangalore (IN); Srinivasan Thirunarayanan, Tamilnadu (IN); Akshat Choudhary, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 1370 days.

This patent is subject to a terminal disclaimer.

(21) Appl. No.: 12/359,982

(22) Filed: Jan. 26, 2009

(65) Prior Publication Data

US 2009/0193498 A1 Jul. 30, 2009

Related U.S. Application Data

(60) Provisional application No. 61/023,848, filed on Jan. 26, 2008.

(51) Int. Cl.
H04L 29/06 (2006.01)
H04L 29/08 (2006.01)

(52) U.S. Cl.
CPC ............ *H04L 63/20* (2013.01); *H04L 67/2814* (2013.01); *H04L 67/02* (2013.01); *H04L 63/166* (2013.01); *H04L 63/105* (2013.01); *H04L 63/0281* (2013.01); *H04L 29/08846* (2013.01); *H04L 63/0272* (2013.01)
USPC ............................................ 726/15; 713/153

(58) Field of Classification Search
CPC ..................... H04L 63/0272; H04L 29/08846; H04L 63/0281; H04L 63/105; H04L 63/20; H04L 63/06612
USPC .............................................. 726/15; 713/153
See application file for complete search history.

(56) References Cited

U.S. PATENT DOCUMENTS 7,930,365 B2 * 4/2011 Dixit et al. ..................... 709/219
8,132,247 B2 * 3/2012 Adhya et al. .................... 726/11

(Continued)

FOREIGN PATENT DOCUMENTS

AU 2004 100 333 A4 6/2004

OTHER PUBLICATIONS

International Search Report from PCT/US2009/032042, mailed Jul. 10, 2009, 6 pages.

(Continued)

*Primary Examiner* — Michael Pyzocha
(74) *Attorney, Agent, or Firm* — Foley & Lardner LLP; Christopher J. McKenna; Paul M. H. Pua

(57) ABSTRACT

The present disclosure provides solutions that may enable an enterprise providing services to a number of clients to determine whether to establish a client based SSL VPN session or a clientless SSL VPN session with a client based on an information associated with the client. An intermediary establishing SSL VPN sessions between clients and servers may receive a request from a client to access a server. The intermediary may identify a session policy based on the request. The session policy may indicate whether to establish a client based SSL VPN session or clientless SSL VPN session with the server. The intermediary may determine, responsive to the policy, to establish a clientless or client based SSL VPN session between the client and the server.

21 Claims, 14 Drawing Sheets

(56) References Cited

U.S. PATENT DOCUMENTS

| | | | |
|---|---|---|---|
| 2002/0184527 A1 | 12/2002 | Chun et al. | |
| 2005/0251856 A1 | 11/2005 | Araujo et al. | |
| 2005/0273849 A1 | 12/2005 | Araujo et al. | |
| 2006/0005008 A1* | 1/2006 | Kao | 713/153 |
| 2006/0037071 A1 | 2/2006 | Rao et al. | |
| 2006/0041637 A1 | 2/2006 | Jerrard-Dunne | |
| 2006/0259544 A1* | 11/2006 | Zubenko et al. | 709/203 |
| 2007/0011340 A1 | 1/2007 | Seidl et al. | |
| 2007/0245409 A1* | 10/2007 | Harris et al. | 726/5 |
| 2008/0183902 A1 | 7/2008 | Cooper et al. | |
| 2009/0089874 A1* | 4/2009 | Mohanty et al. | 726/15 |
| 2009/0158420 A1* | 6/2009 | Ks et al. | 726/15 |

OTHER PUBLICATIONS

Written Opinion from PCT/US2009/032042, mailed Jul. 10, 2009, 11 pages.

"Aventail Smart Access: Secure and Easy for Users and IT." Jun. 21, 2006. http://www.findwhitepapers.com/force-download.php?id=255. Retrieved on Apr. 21, 2009.

"User Guide for Cisco Security Manager 3.1." Sep. 24, 2007. http://www.cisco.com/en/US/docs/security/security_management/security_manager/3.1/user/guide/smcfg.pdf. Retrieved Apr. 21, 2009. pp. 799-854, 2555-2624.

"What's new in NGX: Connectra." Oct. 21, 2007. http://web.archive.org/web/20071021192852/http://www.checkpoint.com/ngx/upgrade/whatsnew/products/connectra.html. Retrieved on Apr. 21, 2009.

"Remote Access Anytime, Anywhere." 2007. http://www.metadigm.co.uk/resources/documents/datasheets/checkpoint/Remote%20access/SSL_Network_Extender_whitepaper.pdf. Retrieved Apr. 21, 2009.

Office Action on U.S. Appl. No. 12/359,998 dated Dec. 19, 2011.
Office Action on U.S. Appl. No. 12/359,998 dated May 15, 2012.
US Office Action for U.S. Appl. No. 12/359,998 dated Jun. 13, 2013.

* cited by examiner

SYSTEMS AND METHODS FOR FINE GRAIN POLICY DRIVEN CLIENTLESS SSL VPN ACCESS

RELATED APPLICATIONS

The present application claims priority to U.S. Provisional Application No. 61/023,848 filed on Jan. 26, 2008, incorporated herein by reference.

FIELD OF THE INVENTION

The present application generally relates to data communication networks. In particular, the present application relates to systems and methods for policy control of SSL VPN clientless access, fine grain policy driven rewrite of URLs during SSL VPN clientless access, and configuration and policy driven detection of embedded URLs in different content types served from a server to a client during SSL VPN clientless access.

BACKGROUND OF THE INVENTION

A company or an enterprise may provide various services across a network to serve a variety of clients. Some of these clients may satisfy the security requirements of the enterprise while others may access the resources of the enterprise from networks, services or locations which may not be safe. The enterprise may choose to allow all the clients to access the resources, but may decide to protect sensitive information relating the resources of the servers from some, or all, of the clients. In one example, a client may request to access resources provided by a server of the enterprise. Managing when and how to provide access to resources to the variety and multitude of claims is challenging.

BRIEF SUMMARY OF THE INVENTION

The present disclosure provides solutions to this and similar problems that may enable the enterprise to determine to establish a client based SSL VPN session or a clientless SSL VPN session with a client. The present disclosure provides solutions that may enable an enterprise providing services to a number of clients to determine whether to establish a client based SSL VPN session or a clientless SSL VPN session with a client based on an information associated with the client. An intermediary establishing SSL VPN sessions between clients and servers may receive a request from a client to access a server. The intermediary may identify a session policy based on the request. The session policy may indicate whether to establish a client based SSL VPN session or clientless SSL VPN session with the server. The intermediary may determine, responsive to the policy, to establish a clientless or client based SSL VPN session between the client and the server.

In some aspects, the present disclosure is related to methods for establishing, via policy, a clientless secure socket layer virtual private network (SSL VPN) session between a client and a server. The intermediary may receive a request from a client to access a server. The intermediary may establish SSL VPN sessions between any number of clients and servers. The intermediary may identify a session policy based on the request. The session policy may indicate whether to establish a client based SSL VPN session or clientless SSL VPN session with the server. The intermediary may determine, responsive to the policy, to establish a clientless SSL VPN session between the client and the server.

In some embodiments, the intermediary establishes, responsive to the determination, the clientless SSL VPN session with the server. In further embodiments, the intermediary receives the request from the client to access an application on the server. The session policy may indicate whether to establish the client based or clientless SSL VPN session with the server based on the application. In some embodiments, the intermediary identifies, responsive to one or more policies, an access profile for controlling access via the clientless SSL VPN session, the access profile specifying one or more rewrite policies for the application. In further embodiments, the intermediary receives the request from a user to access the server. In still further embodiments, the session policy indicates whether to establish the client based or clientless SSL VPN session with the server based on the user. In some embodiments, the intermediary identifies an access profile for establishing the clientless SSL VPN session and the access profile specifies one or more rewrite policies. In some embodiments, the intermediary identifies, responsive to one or more policies, a first access profile from a plurality of access profiles for controlling access via the clientless SSL VPN session, the access profile specifying one or more rewrite policies. In further embodiments, the intermediary identifies, responsive to one or more policies, a first access profile from a plurality of access profiles for controlling access via the clientless SSL VPN session. In some embodiments the first access profile is identified based on one or more of the following: a user of the request, an application identified by the request, information about the client, and the server identified by the request.

In some aspects, the present disclosure is related to methods for establishing via policy a clientless secure socket layer virtual private network (SSL VPN) session between a client and a server. A packet engine may receive a request from a client to access a server. The intermediary may establish SSL VPN sessions between clients and the server. A policy engine may identify a session policy based on the request, the session policy indicating whether to establish a client based SSL VPN session or clientless SSL VPN session with the server. The intermediary may determine, responsive to the policy, to establish a clientless SSL VPN session between the client and the server.

In some embodiments, the intermediary establishes, responsive to the determination, the clientless SSL VPN session with the server. In further embodiments, the intermediary comprising the packet engine receives the request from the client to access an application on the server and the session policy indicating whether to establish the client based or clientless SSL VPN session with the server based on the application. In some embodiments, the intermediary further comprising the policy engine responsive to one or more policies identifies an access profile for controlling access via the clientless SSL VPN session, the access profile specifying one or more rewrite policies for the application. In further embodiments, the intermediary further comprising the packet engine receives the request from a user to access the server and the session policy indicating whether to establish the client based or clientless SSL VPN session with the server based on the user. The policy engine of the intermediary may identify an access profile for controlling access the clientless SSL VPN session and the access profile specifies one or more rewrite policies. In some embodiments, the policy engine identifies, responsive to one or more policies, a first access profile from a plurality of access profiles for controlling access via the clientless SSL VPN session, the access profile specifying one or more rewrite policies. In further embodiments, the policy engine identifies, responsive to one or more policies, a first access profile from a plurality of access profiles for controlling access via the clientless SSL VPN session. In still further embodiments, comprises the policy engine identifying the first access profile based on one or more of the following: a user of the request, an application identified by the request, information about the client, and the server identified by the request.

In some aspects, the present disclosure is related to an intermediary for establishing via policy a clientless secure socket layer virtual private network (SSL VPN) session between a client and a server. The intermediary may include a means for receiving a request from a client to access a server. The intermediary may establish SSL VPN sessions between clients and the server. The intermediary may include a means for identifying a session policy based on the request, the session policy indicating whether to establish a client based or clientless SSL VPN session with the server. The intermediary may include a means for determining, responsive to the policy, to establish a clientless SSL VPN session between the client and the server.

BRIEF DESCRIPTION OF THE FIGURES

The foregoing and other objects, aspects, features, and advantages of the invention will become more apparent and better understood by referring to the following description taken in conjunction with the accompanying drawings, in which.

Figure 1A:
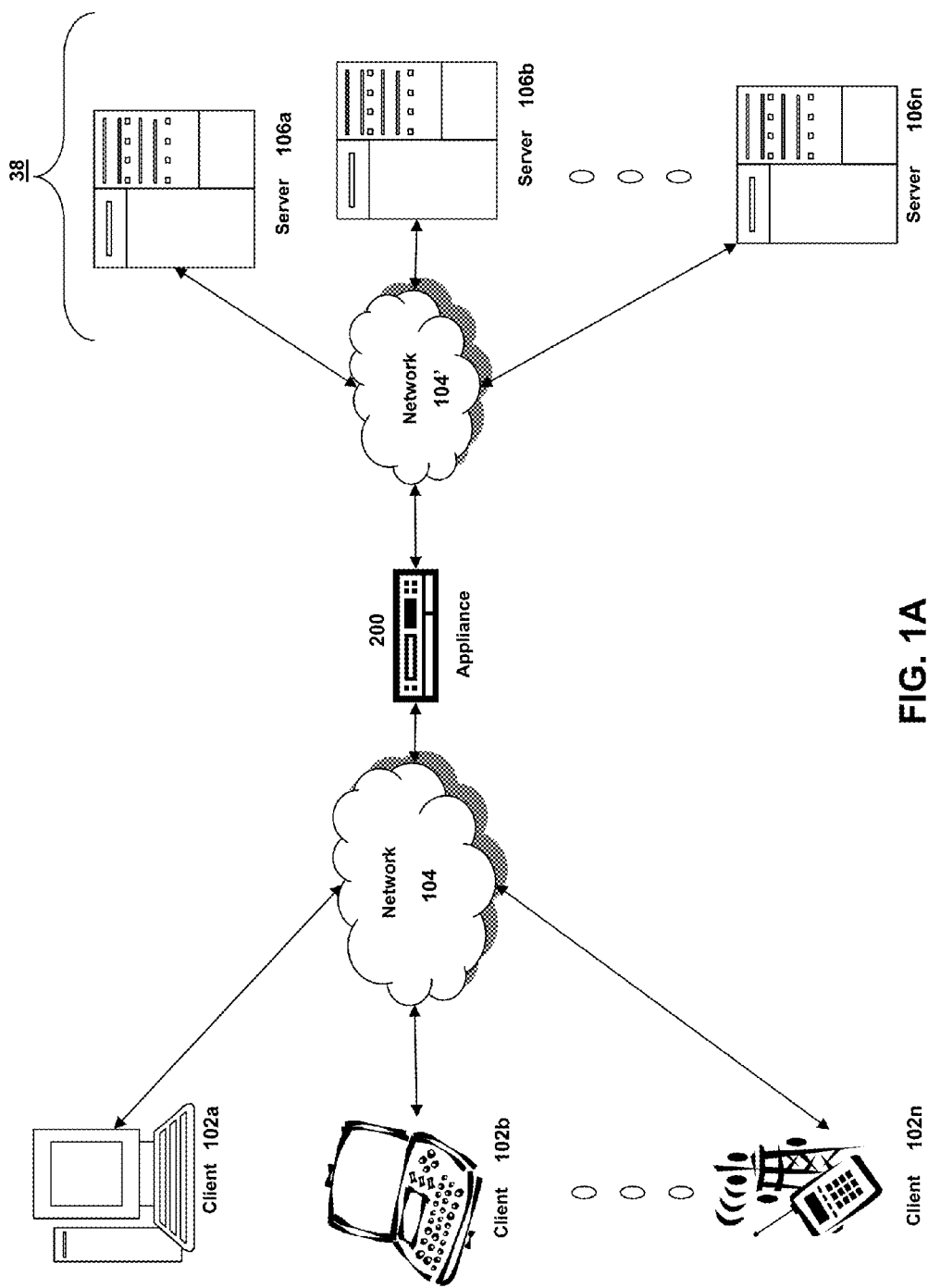
FIGS. 1A, 1B and 1C are block diagrams of embodiments of a network environment for a client to access a server via one or more appliances.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

A. Network and Computing Environment

Prior to discussing the specifics of embodiments of the systems and methods of an appliance and/or client, it may be helpful to discuss the network and computing environments in which such embodiments may be deployed. Referring now to FIG. 1A, an embodiment of a network environment is depicted. In brief overview, the network environment comprises one or more clients 102a-102n (also generally referred to as local machine(s) 102, or client(s) 102) in communication with one or more servers 106a-106n (also generally referred to as server(s) 106, or remote machine(s) 106) via one or more networks 104, 104' (generally referred to as network 104). In some embodiments, a client 102 communicates with a server 106 via an appliance 200.

Although FIG. 1A shows a network 104 and a network 104' between the clients 102 and the servers 106, the clients 102 and the servers 106 may be on the same network 104. The networks 104 and 104' can be the same type of network or different types of networks. The network 104 and/or the network 104' can be a local-area network (LAN), such as a company Intranet, a metropolitan area network (MAN), or a wide area network (WAN), such as the Internet or the World Wide Web. In one embodiment, network 104' may be a private network and network 104 may be a public network. In some embodiments, network 104 may be a private network and network 104' a public network. In another embodiment, networks 104 and 104' may both be private networks. In some embodiments, clients 102 may be located at a branch office of a corporate enterprise communicating via a WAN connection over the network 104 to the servers 106 located at a corporate data center.

The network 104 and/or 104' be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 and/or 104' may be a bus, star, or ring network topology. The network 104 and/or 104' and network topology may be of any such network or network topology as known to those ordinarily skilled in the art capable of supporting the operations described herein.

As shown in FIG. 1A, the appliance 200, which also may be referred to as an interface unit 200 or gateway 200, is shown between the networks 104 and 104'. In some embodiments, the appliance 200 may be located on network 104. For example, a branch office of a corporate enterprise may deploy an appliance 200 at the branch office. In other embodiments, the appliance 200 may be located on network 104'. For example, an appliance 200 may be located at a corporate data center. In yet another embodiment, a plurality of appliances 200 may be deployed on network 104. In some embodiments, a plurality of appliances 200 may be deployed on network 104'. In one embodiment, a first appliance 200 communicates with a second appliance 200'. In other embodiments, the appliance 200 could be a part of any client 102 or server 106 on the same or different network 104,104' as the client 102. One or more appliances 200 may be located at any point in the network or network communications path between a client 102 and a server 106.

In some embodiments, the appliance 200 comprises any of the network devices manufactured by Citrix Systems, Inc. of Ft. Lauderdale Fla., referred to as Citrix NetScaler devices. In other embodiments, the appliance 200 includes any of the product embodiments referred to as WebAccelerator and BigIP manufactured by F5 Networks, Inc. of Seattle, Wash. In another embodiment, the appliance 205 includes any of the DX acceleration device platforms and/or the SSL VPN series of devices, such as SA 700, SA 2000, SA 4000, and SA 6000 devices manufactured by Juniper Networks, Inc. of Sunnyvale, Calif. In yet another embodiment, the appliance 200 includes any application acceleration and/or security related appliances and/or software manufactured by Cisco Systems, Inc. of San Jose, Calif., such as the Cisco ACE Application Control Engine Module service software and network modules, and Cisco AVS Series Application Velocity System.

In one embodiment, the system may include multiple, logically-grouped servers 106. In these embodiments, the logical group of servers may be referred to as a server farm 38. In some of these embodiments, the serves 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or medium-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be referred to as a file server, application server, web server, proxy server, or gateway server. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106' hosting a requested application.

In one embodiment, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

Figure 1B:
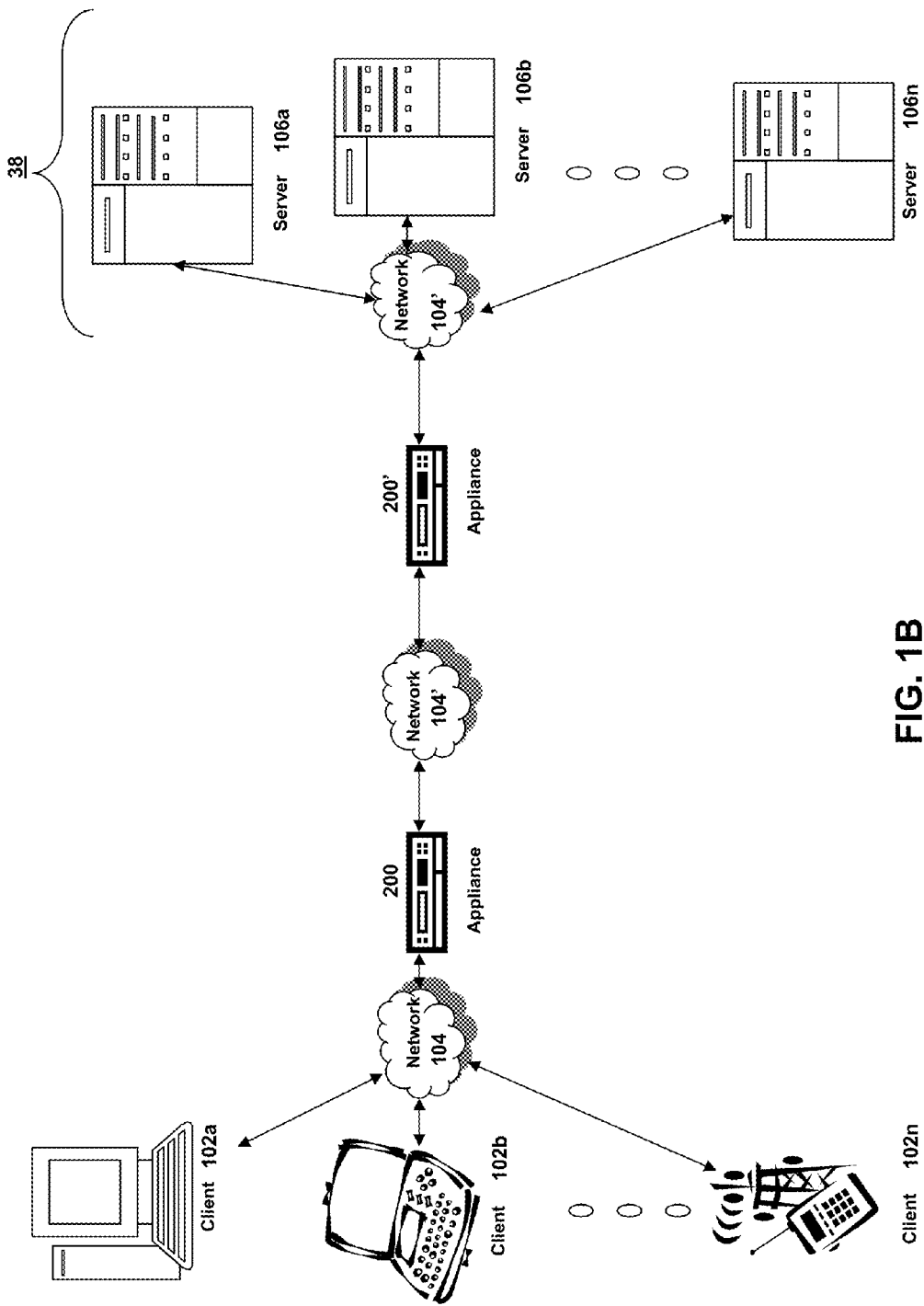
Figure 1C:
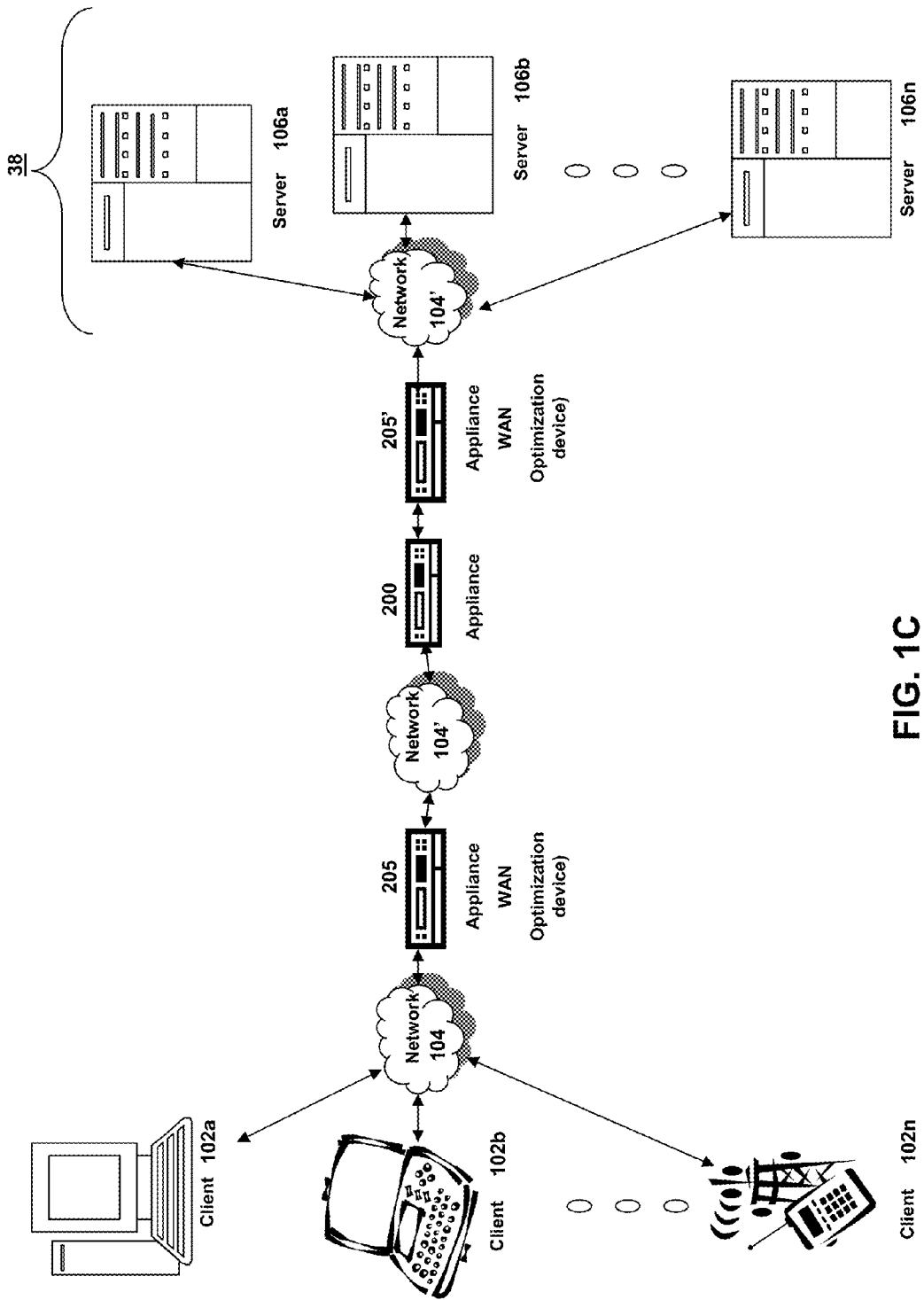

Referring now to FIG. 1B, an embodiment of a network environment deploying multiple appliances 200 is depicted. A first appliance 200 may be deployed on a first network 104 and a second appliance 200' on a second network 104'. For example a corporate enterprise may deploy a first appliance 200 at a branch office and a second appliance 200' at a data center. In another embodiment, the first appliance 200 and second appliance 200' are deployed on the same network 104 or network 104. For example, a first appliance 200 may be deployed for a first server farm 38, and a second appliance 200 may be deployed for a second server farm 38'. In another example, a first appliance 200 may be deployed at a first branch office while the second appliance 200' is deployed at a second branch office. In some embodiments, the first appliance 200 and second appliance 200' work in cooperation or in conjunction with each other to accelerate network traffic or the delivery of application and data between a client and a server Referring now to FIG. 1C, another embodiment of a network environment deploying the appliance 200 with one or more other types of appliances, such as between one or more WAN optimization appliance 205, 205' is depicted. For example a first WAN optimization appliance 205 is shown between networks 104 and 104' and s second WAN optimization appliance 205' may be deployed between the appliance 200 and one or more servers 106. By way of example, a corporate enterprise may deploy a first WAN optimization appliance 205 at a branch office and a second WAN optimization appliance 205' at a data center. In some embodiments, the appliance 205 may be located on network 104'. In other embodiments, the appliance 205' may be located on network 104. In some embodiments, the appliance 205' may be located on network 104' or network 104". In one embodiment, the appliance 205 and 205' are on the same network. In another embodiment, the appliance 205 and 205' are on different networks. In another example, a first WAN optimization appliance 205 may be deployed for a first server farm 38 and a second WAN optimization appliance 205' for a second server farm 38'.

In one embodiment, the appliance 205 is a device for accelerating, optimizing or otherwise improving the performance, operation, or quality of service of any type and form of network traffic, such as traffic to and/or from a WAN connection. In some embodiments, the appliance 205 is a performance enhancing proxy. In other embodiments, the appliance 205 is any type and form of WAN optimization or acceleration device, sometimes also referred to as a WAN optimization controller. In one embodiment, the appliance 205 is any of the product embodiments referred to as WANScaler manufactured by Citrix Systems, Inc. of Ft. Lauderdale, Fla. In other embodiments, the appliance 205 includes any of the product embodiments referred to as BIG-IP link controller and WANjet manufactured by F5 Networks, Inc. of Seattle, Wash. In another embodiment, the appliance 205 includes any of the WX and WXC WAN acceleration device platforms manufactured by Juniper Networks, Inc. of Sunnyvale, Calif. In some embodiments, the appliance 205 includes any of the steelhead line of WAN optimization appliances manufactured by Riverbed Technology of San Francisco, Calif. In other embodiments, the appliance 205 includes any of the WAN related devices manufactured by Expand Networks Inc. of Roseland, N.J. In one embodiment, the appliance 205 includes any of the WAN related appliances manufactured by Packeteer Inc. of Cupertino, Calif., such as the PacketShaper, iShared, and SkyX product embodiments provided by Packeteer. In yet another embodiment, the appliance 205 includes any WAN related appliances and/or software manufactured by Cisco Systems, Inc. of San Jose, Calif., such as the Cisco Wide Area Network Application Services software and network modules, and Wide Area Network engine appliances.

In one embodiment, the appliance 205 provides application and data acceleration services for branch-office or remote offices. In one embodiment, the appliance 205 includes optimization of Wide Area File Services (WAFS). In another embodiment, the appliance 205 accelerates the delivery of files, such as via the Common Internet File System (CIFS) protocol. In other embodiments, the appliance 205 provides caching in memory and/or storage to accelerate delivery of applications and data. In one embodiment, the appliance 205 provides compression of network traffic at any level of the network stack or at any protocol or network layer. In another embodiment, the appliance 205 provides transport layer protocol optimizations, flow control, performance enhancements or modifications and/or management to accelerate delivery of applications and data over a WAN connection. For example, in one embodiment, the appliance 205 provides Transport Control Protocol (TCP) optimizations. In other embodiments, the appliance 205 provides optimizations, flow control, performance enhancements or modifications and/or management for any session or application layer protocol.

In another embodiment, the appliance 205 encoded any type and form of data or information into custom or standard TCP and/or IP header fields or option fields of network packet to announce presence, functionality or capability to another appliance 205'. In another embodiment, an appliance 205' may communicate with another appliance 205' using data encoded in both TCP and/or IP header fields or options. For example, the appliance may use TCP option(s) or IP header fields or options to communicate one or more parameters to be used by the appliances 205, 205' in performing functionality, such as WAN acceleration, or for working in conjunction with each other.

In some embodiments, the appliance 200 preserves any of the information encoded in TCP and/or IP header and/or option fields communicated between appliances 205 and 205'. For example, the appliance 200 may terminate a transport layer connection traversing the appliance 200, such as a transport layer connection from between a client and a server traversing appliances 205 and 205'. In one embodiment, the appliance 200 identifies and preserves any encoded information in a transport layer packet transmitted by a first appliance 205 via a first transport layer connection and communicates a transport layer packet with the encoded information to a second appliance 205' via a second transport layer connection.

Figure 1D:
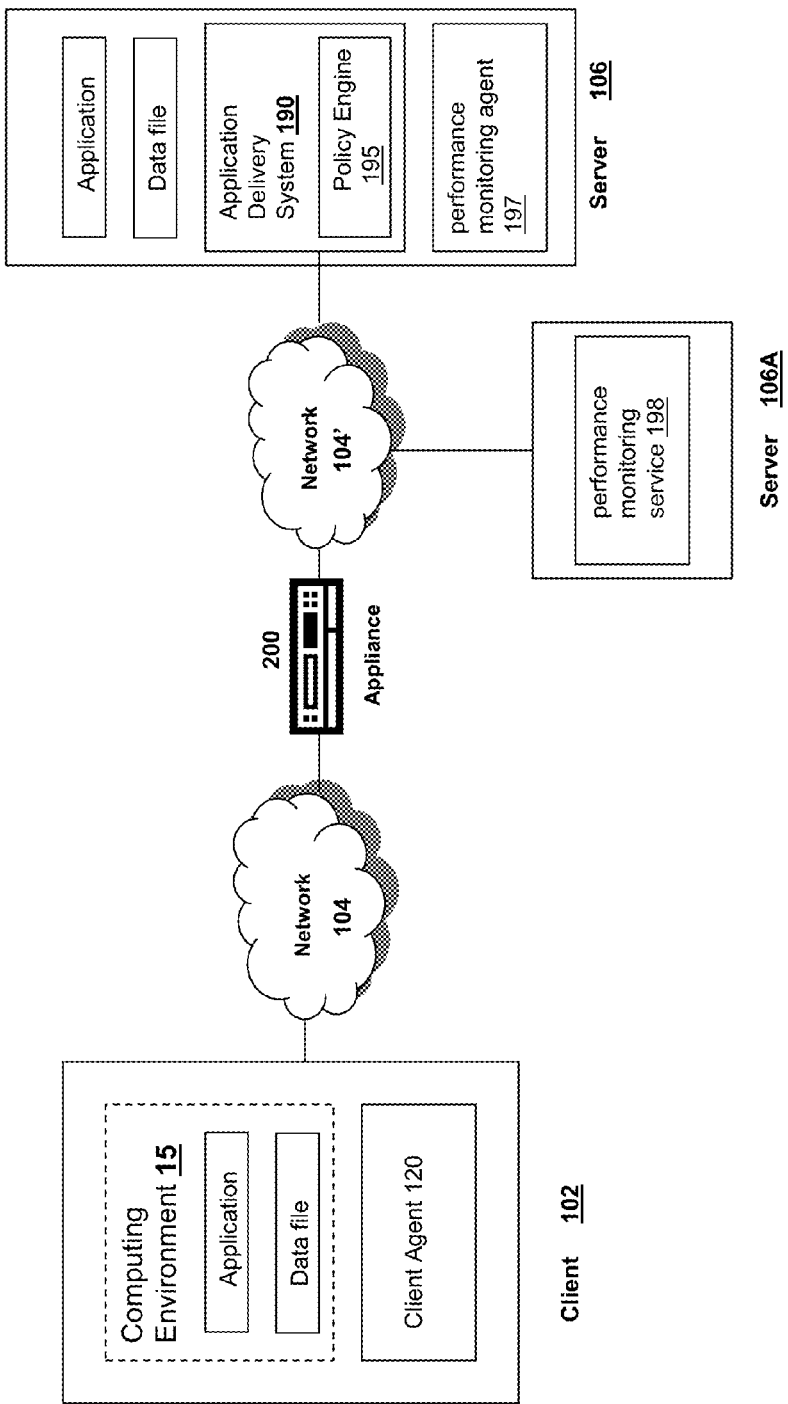
FIG. 1D is a block diagram of an embodiment of an environment for delivering a computing environment from a server to a client via an appliance.

Referring now to FIG. 1D, a network environment for delivering and/or operating a computing environment on a client 102 is depicted. In some embodiments, a server 106 includes an application delivery system 190 for delivering a computing environment or an application and/or data file to one or more clients 102. In brief overview, a client 10 is in communication with a server 106 via network 104, 104' and appliance 200. For example, the client 102 may reside in a remote office of a company, e.g., a branch office, and the server 106 may reside at a corporate data center. The client 102 comprises a client agent 120, and a computing environment 15. The computing environment 15 may execute or operate an application that accesses, processes or uses a data file. The computing environment 15, application and/or data file may be delivered via the appliance 200 and/or the server 106.

In some embodiments, the appliance 200 accelerates delivery of a computing environment 15, or any portion thereof, to a client 102. In one embodiment, the appliance 200 accelerates the delivery of the computing environment 15 by the application delivery system 190. For example, the embodiments described herein may be used to accelerate delivery of a streaming application and data file processable by the application from a central corporate data center to a remote user location, such as a branch office of the company. In another embodiment, the appliance 200 accelerates transport layer traffic between a client 102 and a server 106. The appliance 200 may provide acceleration techniques for accelerating any transport layer payload from a server 106 to a client 102, such as: 1) transport layer connection pooling, 2) transport layer connection multiplexing, 3) transport control protocol buffering, 4) compression and 5) caching. In some embodiments, the appliance 200 provides load balancing of servers 106 in responding to requests from clients 102. In other embodiments, the appliance 200 acts as a proxy or access server to provide access to the one or more servers 106. In another embodiment, the appliance 200 provides a secure virtual private network connection from a first network 104 of the client 102 to the second network 104' of the server 106, such as an SSL VPN connection. It yet other embodiments, the appliance 200 provides application firewall security, control and management of the connection and communications between a client 102 and a server 106.

In some embodiments, the application delivery management system 190 provides application delivery techniques to deliver a computing environment to a desktop of a user, remote or otherwise, based on a plurality of execution methods and based on any authentication and authorization policies applied via a policy engine 195. With these techniques, a remote user may obtain a computing environment and access to server stored applications and data files from any network connected device 100. In one embodiment, the application delivery system 190 may reside or execute on a server 106. In another embodiment, the application delivery system 190 may reside or execute on a plurality of servers 106a-106n. In some embodiments, the application delivery system 190 may execute in a server farm 38. In one embodiment, the server 106 executing the application delivery system 190 may also store or provide the application and data file. In another embodiment, a first set of one or more servers 106 may execute the application delivery system 190, and a different server 106n may store or provide the application and data file. In some embodiments, each of the application delivery system 190, the application, and data file may reside or be located on different servers. In yet another embodiment, any portion of the application delivery system 190 may reside, execute or be stored on or distributed to the appliance 200, or a plurality of appliances.

The client 102 may include a computing environment 15 for executing an application that uses or processes a data file. The client 102 via networks 104, 104' and appliance 200 may request an application and data file from the server 106. In one embodiment, the appliance 200 may forward a request from the client 102 to the server 106. For example, the client 102 may not have the application and data file stored or accessible locally. In response to the request, the application delivery system 190 and/or server 106 may deliver the application and data file to the client 102. For example, in one embodiment, the server 106 may transmit the application as an application stream to operate in computing environment 15 on client 102.

In some embodiments, the application delivery system 190 comprises any portion of the Citrix Access Suite™ by Citrix Systems, Inc., such as the MetaFrame or Citrix Presentation Server™ and/or any of the Microsoft® Windows Terminal Services manufactured by the Microsoft Corporation. In one embodiment, the application delivery system 190 may deliver one or more applications to clients 102 or users via a remote-display protocol or otherwise via remote-based or server-based computing. In another embodiment, the application delivery system 190 may deliver one or more applications to clients or users via steaming of the application.

In one embodiment, the application delivery system 190 includes a policy engine 195 for controlling and managing the access to, selection of application execution methods and the delivery of applications. In some embodiments, the policy engine 195 determines the one or more applications a user or client 102 may access. In another embodiment, the policy engine 195 determines how the application should be delivered to the user or client 102, e.g., the method of execution. In some embodiments, the application delivery system 190 provides a plurality of delivery techniques from which to select a method of application execution, such as a server-based computing, streaming or delivering the application locally to the client 120 for local execution.

In one embodiment, a client 102 requests execution of an application program and the application delivery system 190 comprising a server 106 selects a method of executing the application program. In some embodiments, the server 106 receives credentials from the client 102. In another embodiment, the server 106 receives a request for an enumeration of available applications from the client 102. In one embodiment, in response to the request or receipt of credentials, the application delivery system 190 enumerates a plurality of application programs available to the client 102. The application delivery system 190 receives a request to execute an enumerated application. The application delivery system 190 selects one of a predetermined number of methods for executing the enumerated application, for example, responsive to a policy of a policy engine. The application delivery system 190 may select a method of execution of the application enabling the client 102 to receive application-output data generated by execution of the application program on a server 106. The application delivery system 190 may select a method of execution of the application enabling the local machine 10 to execute the application program locally after retrieving a plurality of application files comprising the application. In yet another embodiment, the application delivery system 190 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to VoIP communications, such as a soft IP telephone. In further embodiments, the application comprises any application related to real-time data communications, such as applications for streaming video and/or audio.

In some embodiments, the server 106 or a server farm 38 may be running one or more applications, such as an application providing a thin-client computing or remote display presentation application. In one embodiment, the server 106 or server farm 38 executes as an application, any portion of the Citrix Access Suite™ by Citrix Systems, Inc., such as the MetaFrame or Citrix Presentation Server™, and/or any of the Microsoft® Windows Terminal Services manufactured by the Microsoft Corporation. In one embodiment, the application is an ICA client, developed by Citrix Systems, Inc. of Fort Lauderdale, Fla. In other embodiments, the application includes a Remote Desktop (RDP) client, developed by Microsoft Corporation of Redmond, Wash. Also, the server 106 may run an application, which for example, may be an application server providing email services such as Microsoft Exchange manufactured by the Microsoft Corporation of Redmond, Wash., a web or Internet server, or a desktop sharing server, or a collaboration server. In some embodiments, any of the applications may comprise any type of hosted service or products, such as GoToMeeting™ provided by Citrix Online Division, Inc. of Santa Barbara, Calif., WebEX™ provided by WebEx, Inc. of Santa Clara, Calif., or Microsoft Office Live Meeting provided by Microsoft Corporation of Redmond, Wash.

Still referring to FIG. 1D, an embodiment of the network environment may include a monitoring server 106A. The monitoring server 106A may include any type and form performance monitoring service 198. The performance monitoring service 198 may include monitoring, measurement and/or management software and/or hardware, including data collection, aggregation, analysis, management and reporting. In one embodiment, the performance monitoring service 198 includes one or more monitoring agents 197. The monitoring agent 197 includes any software, hardware or combination thereof for performing monitoring, measurement and data collection activities on a device, such as a client 102, server 106 or an appliance 200, 205. In some embodiments, the monitoring agent 197 includes any type and form of script, such as Visual Basic script, or Javascript. In one embodiment, the monitoring agent 197 executes transparently to any application and/or user of the device. In some embodiments, the monitoring agent 197 is installed and operated unobtrusively to the application or client. In yet another embodiment, the monitoring agent 197 is installed and operated without any instrumentation for the application or device.

In some embodiments, the monitoring agent 197 monitors, measures and collects data on a predetermined frequency. In other embodiments, the monitoring agent 197 monitors, measures and collects data based upon detection of any type and form of event. For example, the monitoring agent 197 may collect data upon detection of a request for a web page or receipt of an HTTP response. In another example, the monitoring agent 197 may collect data upon detection of any user input events, such as a mouse click. The monitoring agent 197 may report or provide any monitored, measured or collected data to the monitoring service 198. In one embodiment, the monitoring agent 197 transmits information to the monitoring service 198 according to a schedule or a predetermined frequency. In another embodiment, the monitoring agent 197 transmits information to the monitoring service 198 upon detection of an event.

In some embodiments, the monitoring service 198 and/or monitoring agent 197 performs monitoring and performance measurement of any network resource or network infrastructure element, such as a client, server, server farm, appliance 200, appliance 205, or network connection. In one embodiment, the monitoring service 198 and/or monitoring agent 197 performs monitoring and performance measurement of any transport layer connection, such as a TCP or UDP connection. In another embodiment, the monitoring service 198 and/or monitoring agent 197 monitors and measures network latency. In yet one embodiment, the monitoring service 198 and/or monitoring agent 197 monitors and measures bandwidth utilization.

In other embodiments, the monitoring service 198 and/or monitoring agent 197 monitors and measures end-user response times. In some embodiments, the monitoring service 198 performs monitoring and performance measurement of an application. In another embodiment, the monitoring service 198 and/or monitoring agent 197 performs monitoring and performance measurement of any session or connection to the application. In one embodiment, the monitoring service 198 and/or monitoring agent 197 monitors and measures performance of a browser. In another embodiment, the monitoring service 198 and/or monitoring agent 197 monitors and measures performance of HTTP based transactions. In some embodiments, the monitoring service 198 and/or monitoring agent 197 monitors and measures performance of a Voice over IP (VoIP) application or session. In other embodiments, the monitoring service 198 and/or monitoring agent 197 monitors and measures performance of a remote display protocol application, such as an ICA client or RDP client. In yet another embodiment, the monitoring service 198 and/or monitoring agent 197 monitors and measures performance of any type and form of streaming media. In still a further embodiment, the monitoring service 198 and/or monitoring agent 197 monitors and measures performance of a hosted application or a Software-As-A-Service (SaaS) delivery model.

In some embodiments, the monitoring service 198 and/or monitoring agent 197 performs monitoring and performance measurement of one or more transactions, requests or responses related to application. In other embodiments, the monitoring service 198 and/or monitoring agent 197 monitors and measures any portion of an application layer stack, such as any .NET or J2EE calls. In one embodiment, the monitoring service 198 and/or monitoring agent 197 monitors and measures database or SQL transactions. In yet another embodiment, the monitoring service 198 and/or monitoring agent 197 monitors and measures any method, function or application programming interface (API) call.

In one embodiment, the monitoring service 198 and/or monitoring agent 197 performs monitoring and performance measurement of a delivery of application and/or data from a server to a client via one or more appliances, such as appliance 200 and/or appliance 205. In some embodiments, the monitoring service 198 and/or monitoring agent 197 monitors and measures performance of delivery of a virtualized application. In other embodiments, the monitoring service 198 and/or monitoring agent 197 monitors and measures performance of delivery of a streaming application. In another embodiment, the monitoring service 198 and/or monitoring agent 197 monitors and measures performance of delivery of a desktop application to a client and/or the execution of the desktop application on the client. In another embodiment, the monitoring service 198 and/or monitoring agent 197 monitors and measures performance of a client/server application.

In one embodiment, the monitoring service 198 and/or monitoring agent 197 is designed and constructed to provide application performance management for the application delivery system 190. For example, the monitoring service 198 and/or monitoring agent 197 may monitor, measure and manage the performance of the delivery of applications via the Citrix Presentation Server. In this example, the monitoring service 198 and/or monitoring agent 197 monitors individual ICA sessions. The monitoring service 198 and/or monitoring agent 197 may measure the total and per session system resource usage, as well as application and networking performance. The monitoring service 198 and/or monitoring agent 197 may identify the active servers for a given user and/or user session. In some embodiments, the monitoring service 198 and/or monitoring agent 197 monitors back-end connections between the application delivery system 190 and an application and/or database server. The monitoring service 198 and/or monitoring agent 197 may measure network latency, delay and volume per user-session or ICA session.

In some embodiments, the monitoring service 198 and/or monitoring agent 197 measures and monitors memory usage for the application delivery system 190, such as total memory usage, per user session and/or per process. In other embodiments, the monitoring service 198 and/or monitoring agent 197 measures and monitors CPU usage the application delivery system 190, such as total CPU usage, per user session and/or per process. In another embodiments, the monitoring service 198 and/or monitoring agent 197 measures and monitors the time required to log-in to an application, a server, or the application delivery system, such as Citrix Presentation Server. In one embodiment, the monitoring service 198 and/or monitoring agent 197 measures and monitors the duration a user is logged into an application, a server, or the application delivery system 190. In some embodiments, the monitoring service 198 and/or monitoring agent 197 measures and monitors active and inactive session counts for an application, server or application delivery system session. In yet another embodiment, the monitoring service 198 and/or monitoring agent 197 measures and monitors user session latency.

In yet further embodiments, the monitoring service 198 and/or monitoring agent 197 measures and monitors measures and monitors any type and form of server metrics. In one embodiment, the monitoring service 198 and/or monitoring agent 197 measures and monitors metrics related to system memory, CPU usage, and disk storage. In another embodiment, the monitoring service 198 and/or monitoring agent 197 measures and monitors metrics related to page faults, such as page faults per second. In other embodiments, the monitoring service 198 and/or monitoring agent 197 measures and monitors round-trip time metrics. In yet another embodiment, the monitoring service 198 and/or monitoring agent 197 measures and monitors metrics related to application crashes, errors and/or hangs.

In some embodiments, the monitoring service 198 and monitoring agent 198 includes any of the product embodiments referred to as EdgeSight manufactured by Citrix Systems, Inc. of Ft. Lauderdale, Fla. In another embodiment, the performance monitoring service 198 and/or monitoring agent 198 includes any portion of the product embodiments referred to as the TrueView product suite manufactured by the Symphoniq Corporation of Palo Alto, Calif. In one embodiment, the performance monitoring service 198 and/or monitoring agent 198 includes any portion of the product embodiments referred to as the TeaLeaf CX product suite manufactured by the TeaLeaf Technology Inc. of San Francisco, Calif. In other embodiments, the performance monitoring service 198 and/or monitoring agent 198 includes any portion of the business service management products, such as the BMC Performance Manager and Patrol products, manufactured by BMC Software, Inc. of Houston, Tex.

Figure 1E:
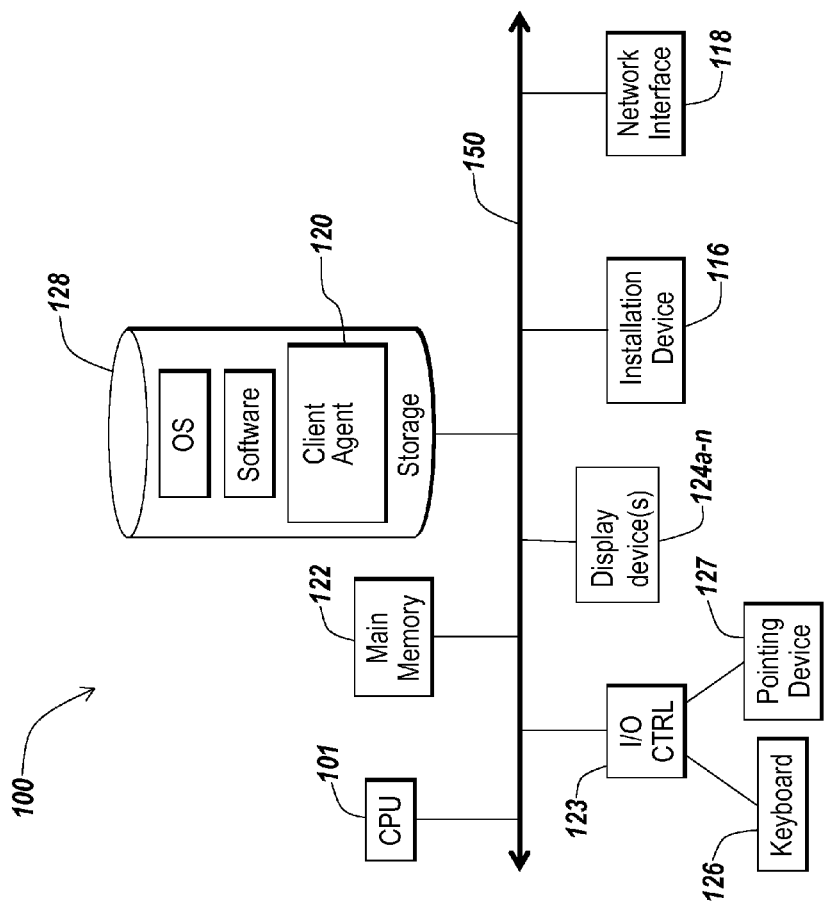
FIGS. 1E and 1F are block diagrams of embodiments of a computing device.
Figure 1F:
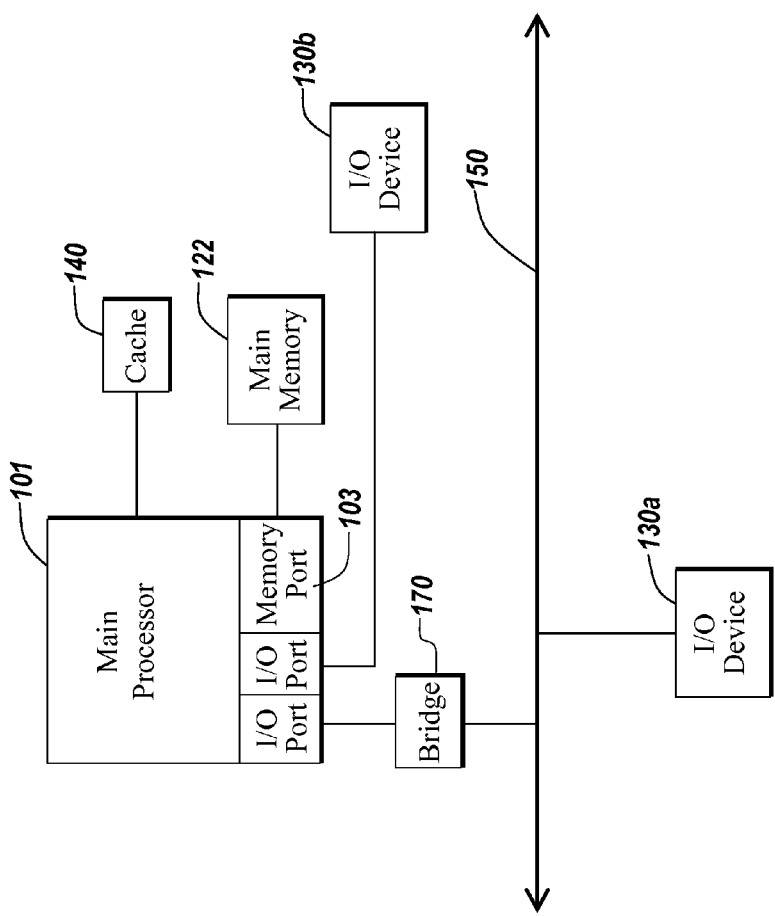

The client 102, server 106, and appliance 200 may be deployed as and/or executed on any type and form of computing device, such as a computer, network device or appliance capable of communicating on any type and form of network and performing the operations described herein. FIGS. 1E and 1F depict block diagrams of a computing device 100 useful for practicing an embodiment of the client 102, server 106 or appliance 200. As shown in FIGS. 1E and 1F, each computing device 100 includes a central processing unit 101, and a main memory unit 122. As shown in FIG. 1E, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1E, the processor 101 communicates with main memory 122 via a system bus 150 (described in more detail below). FIG. 1E depicts an embodiment of a computing device 100 in which the processor communicates directly with main memory 122 via a memory port 103. For example, in FIG. 1F the main memory 122 may be DRDRAM.

FIG. 1F depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1E, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1F depicts an embodiment of a computer 100 in which the main processor 101 communicates directly with I/O device 130 via HyperTransport, Rapid I/O, or InfiniBand. FIG. 1F also depicts an embodiment in which local busses and direct communication are mixed: the processor 101 communicates with I/O device 130 using a local interconnect bus while communicating with I/O device 130 directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, A™), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein. A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1E. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1E and 1F typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

B. Appliance Architecture

Figure 2A:
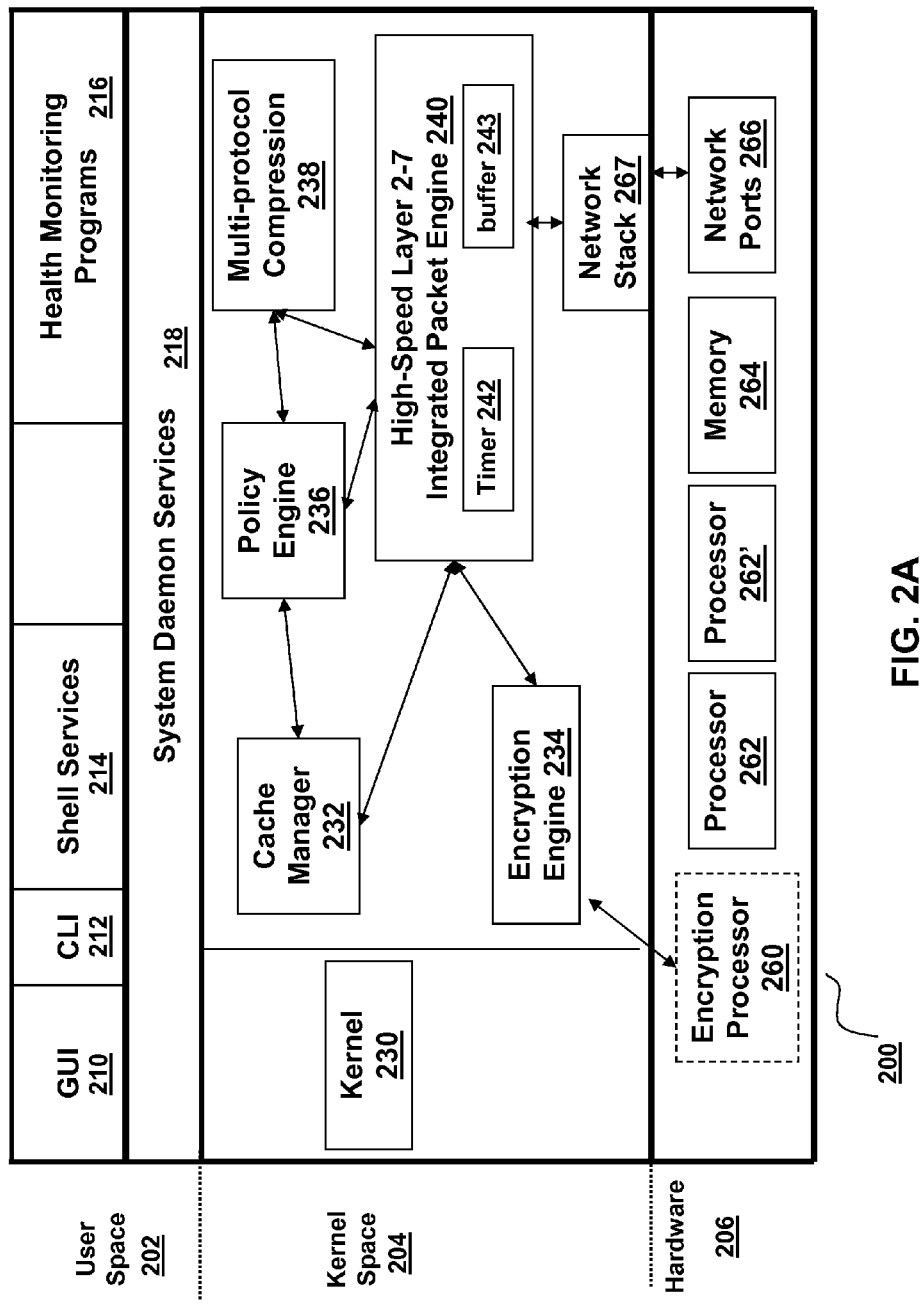
FIG. 2A is a block diagram of an embodiment of an appliance for processing communications between a client and a server.

FIG. 2A illustrates an example embodiment of the appliance 200. The architecture of the appliance 200 in FIG. 2A is provided by way of illustration only and is not intended to be limiting. As shown in FIG. 2, appliance 200 comprises a hardware layer 206 and a software layer divided into a user space 202 and a kernel space 204.

Hardware layer 206 provides the hardware elements upon which programs and services within kernel space 204 and user space 202 are executed. Hardware layer 206 also provides the structures and elements which allow programs and services within kernel space 204 and user space 202 to communicate data both internally and externally with respect to appliance 200. As shown in FIG. 2, the hardware layer 206 includes a processing unit 262 for executing software programs and services, a memory 264 for storing software and data, network ports 266 for transmitting and receiving data over a network, and an encryption processor 260 for performing functions related to Secure Sockets Layer processing of data transmitted and received over the network. In some embodiments, the central processing unit 262 may perform the functions of the encryption processor 260 in a single processor. Additionally, the hardware layer 206 may comprise multiple processors for each of the processing unit 262 and the encryption processor 260. The processor 262 may include any of the processors 101 described above in connection with FIGS. 1E and 1F. In some embodiments, the central processing unit 262 may perform the functions of the encryption processor 260 in a single processor. Additionally, the hardware layer 206 may comprise multiple processors for each of the processing unit 262 and the encryption processor 260. For example, in one embodiment, the appliance 200 comprises a first processor 262 and a second processor 262'. In other embodiments, the processor 262 or 262' comprises a multi-core processor.

Although the hardware layer 206 of appliance 200 is generally illustrated with an encryption processor 260, processor 260 may be a processor for performing functions related to any encryption protocol, such as the Secure Socket Layer (SSL) or Transport Layer Security (TLS) protocol. In some embodiments, the processor 260 may be a general purpose processor (GPP), and in further embodiments, may be have executable instructions for performing processing of any security related protocol.

Although the hardware layer 206 of appliance 200 is illustrated with certain elements in FIG. 2, the hardware portions or components of appliance 200 may comprise any type and form of elements, hardware or software, of a computing device, such as the computing device 100 illustrated and discussed herein in conjunction with FIGS. 1E and 1F. In some embodiments, the appliance 200 may comprise a server, gateway, router, switch, bridge or other type of computing or network device, and have any hardware and/or software elements associated therewith.

The operating system of appliance 200 allocates, manages, or otherwise segregates the available system memory into kernel space 204 and user space 204. In example software architecture 200, the operating system may be any type and/or form of Unix operating system although the invention is not so limited. As such, the appliance 200 can be running any operating system such as any of the versions of the Microsoft® Windows operating systems, the different releases of the Unix and Linux operating systems, any version of the Mac OS® for Macintosh computers, any embedded operating system, any network operating system, any realtime operating system, any open source operating system, any proprietary operating system, any operating systems for mobile computing devices or network devices, or any other operating system capable of running on the appliance 200 and performing the operations described herein.

The kernel space 204 is reserved for running the kernel 230, including any device drivers, kernel extensions or other kernel related software. As known to those skilled in the art, the kernel 230 is the core of the operating system, and provides access, control, and management of resources and hardware-related elements of the application 104. In accordance with an embodiment of the appliance 200, the kernel space 204 also includes a number of network services or processes working in conjunction with a cache manager 232, sometimes also referred to as the integrated cache, the benefits of which are described in detail further herein. Additionally, the embodiment of the kernel 230 will depend on the embodiment of the operating system installed, configured, or otherwise used by the device 200.

In one embodiment, the device 200 comprises one network stack 267, such as a TCP/IP based stack, for communicating with the client 102 and/or the server 106. In one embodiment, the network stack 267 is used to communicate with a first network, such as network 108, and a second network 110. In some embodiments, the device 200 terminates a first transport layer connection, such as a TCP connection of a client 102, and establishes a second transport layer connection to a server 106 for use by the client 102, e.g., the second transport layer connection is terminated at the appliance 200 and the server 106. The first and second transport layer connections may be established via a single network stack 267. In other embodiments, the device 200 may comprise multiple network stacks, for example 267 and 267', and the first transport layer connection may be established or terminated at one network stack 267, and the second transport layer connection on the second network stack 267'. For example, one network stack may be for receiving and transmitting network packet on a first network, and another network stack for receiving and transmitting network packets on a second network. In one embodiment, the network stack 267 comprises a buffer 243 for queuing one or more network packets for transmission by the appliance 200.

As shown in FIG. 2, the kernel space 204 includes the cache manager 232, a high-speed layer 2-7 integrated packet engine 240, an encryption engine 234, a policy engine 236 and multi-protocol compression logic 238. Running these components or processes 232, 240, 234, 236 and 238 in kernel space 204 or kernel mode instead of the user space 202 improves the performance of each of these components, alone and in combination. Kernel operation means that these components or processes 232, 240, 234, 236 and 238 run in the core address space of the operating system of the device 200. For example, running the encryption engine 234 in kernel mode improves encryption performance by moving encryption and decryption operations to the kernel, thereby reducing the number of transitions between the memory space or a kernel thread in kernel mode and the memory space or a thread in user mode. For example, data obtained in kernel mode may not need to be passed or copied to a process or thread running in user mode, such as from a kernel level data structure to a user level data structure. In another aspect, the number of context switches between kernel mode and user mode are also reduced. Additionally, synchronization of and communications between any of the components or processes 232, 240, 235, 236 and 238 can be performed more efficiently in the kernel space 204.

In some embodiments, any portion of the components 232, 240, 234, 236 and 238 may run or operate in the kernel space 204, while other portions of these components 232, 240, 234, 236 and 238 may run or operate in user space 202. In one embodiment, the appliance 200 uses a kernel-level data structure providing access to any portion of one or more network packets, for example, a network packet comprising a request from a client 102 or a response from a server 106. In some embodiments, the kernel-level data structure may be obtained by the packet engine 240 via a transport layer driver interface or filter to the network stack 267. The kernel-level data structure may comprise any interface and/or data accessible via the kernel space 204 related to the network stack 267, network traffic or packets received or transmitted by the network stack 267. In other embodiments, the kernel-level data structure may be used by any of the components or processes 232, 240, 234, 236 and 238 to perform the desired operation of the component or process. In one embodiment, a component 232, 240, 234, 236 and 238 is running in kernel mode 204 when using the kernel-level data structure, while in another embodiment, the component 232, 240, 234, 236 and 238 is running in user mode when using the kernel-level data structure. In some embodiments, the kernel-level data structure may be copied or passed to a second kernel-level data structure, or any desired user-level data structure.

The cache manager 232 may comprise software, hardware or any combination of software and hardware to provide cache access, control and management of any type and form of content, such as objects or dynamically generated objects served by the originating servers 106. The data, objects or content processed and stored by the cache manager 232 may comprise data in any format, such as a markup language, or communicated via any protocol. In some embodiments, the cache manager 232 duplicates original data stored elsewhere or data previously computed, generated or transmitted, in which the original data may require longer access time to fetch, compute or otherwise obtain relative to reading a cache memory element. Once the data is stored in the cache memory element, future use can be made by accessing the cached copy rather than refetching or recomputing the original data, thereby reducing the access time. In some embodiments, the cache memory element may comprise a data object in memory 264 of device 200. In other embodiments, the cache memory element may comprise memory having a faster access time than memory 264. In another embodiment, the cache memory element may comprise any type and form of storage element of the device 200, such as a portion of a hard disk. In some embodiments, the processing unit 262 may provide cache memory for use by the cache manager 232. In yet further embodiments, the cache manager 232 may use any portion and combination of memory, storage, or the processing unit for caching data, objects, and other content.

Furthermore, the cache manager 232 includes any logic, functions, rules, or operations to perform any embodiments of the techniques of the appliance 200 described herein. For example, the cache manager 232 includes logic or functionality to invalidate objects based on the expiration of an invalidation time period or upon receipt of an invalidation command from a client 102 or server 106. In some embodiments, the cache manager 232 may operate as a program, service, process or task executing in the kernel space 204, and in other embodiments, in the user space 202. In one embodiment, a first portion of the cache manager 232 executes in the user space 202 while a second portion executes in the kernel space 204. In some embodiments, the cache manager 232 can comprise any type of general purpose processor (GPP), or any other type of integrated circuit, such as a Field Programmable Gate Array (FPGA), Programmable Logic Device (PLD), or Application Specific Integrated Circuit (ASIC).

The policy engine 236 may include, for example, an intelligent statistical engine or other programmable application(s). In one embodiment, the policy engine 236 provides a configuration mechanism to allow a user to identifying, specify, define or configure a caching policy. Policy engine 236, in some embodiments, also has access to memory to support data structures such as lookup tables or hash tables to enable user-selected caching policy decisions. In other embodiments, the policy engine 236 may comprise any logic, rules, functions or operations to determine and provide access, control and management of objects, data or content being cached by the appliance 200 in addition to access, control and management of security, network traffic, network access, compression or any other function or operation performed by the appliance 200. Further examples of specific caching policies are further described herein.

The encryption engine 234 comprises any logic, business rules, functions or operations for handling the processing of any security related protocol, such as SSL or TLS, or any function related thereto. For example, the encryption engine 234 encrypts and decrypts network packets, or any portion thereof, communicated via the appliance 200. The encryption engine 234 may also setup or establish SSL or TLS connections on behalf of the client 102a-102n, server 106a-106n, or appliance 200. As such, the encryption engine 234 provides offloading and acceleration of SSL processing. In one embodiment, the encryption engine 234 uses a tunneling protocol to provide a virtual private network between a client 102a-102n and a server 106a-106n. In some embodiments, the encryption engine 234 is in communication with the Encryption processor 260. In other embodiments, the encryption engine 234 comprises executable instructions running on the Encryption processor 260.

The multi-protocol compression engine 238 comprises any logic, business rules, function or operations for compressing one or more protocols of a network packet, such as any of the protocols used by the network stack 267 of the device 200. In one embodiment, multi-protocol compression engine 238 compresses bi-directionally between clients 102a-102n and servers 106a-106n any TCP/IP based protocol, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of Hypertext Markup Language (HTML) based protocols and in some embodiments, provides compression of any markup languages, such as the Extensible Markup Language (XML). In one embodiment, the multi-protocol compression engine 238 provides compression of any high-performance protocol, such as any protocol designed for appliance 200 to appliance 200 communications. In another embodiment, the multi-protocol compression engine 238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 238 accelerates performance for users accessing applications via desktop clients, e.g., Microsoft Outlook and non-Web thin clients, such as any client launched by popular enterprise applications like Oracle, SAP and Siebel, and even mobile clients, such as the Pocket PC. In some embodiments, the multi-protocol compression engine 238 by executing in the kernel mode 204 and integrating with packet processing engine 240 accessing the network stack 267 is able to compress any of the protocols carried by the TCP/IP protocol, such as any application layer protocol.

High speed layer 2-7 integrated packet engine 240, also generally referred to as a packet processing engine or packet engine, is responsible for managing the kernel-level processing of packets received and transmitted by appliance 200 via network ports 266. The high speed layer 2-7 integrated packet engine 240 may comprise a buffer for queuing one or more network packets during processing, such as for receipt of a network packet or transmission of a network packer. Additionally, the high speed layer 2-7 integrated packet engine 240 is in communication with one or more network stacks 267 to send and receive network packets via network ports 266. The high speed layer 2-7 integrated packet engine 240 works in conjunction with encryption engine 234, cache manager 232, policy engine 236 and multi-protocol compression logic 238. In particular, encryption engine 234 is configured to perform SSL processing of packets, policy engine 236 is configured to perform functions related to traffic management such as request-level content switching and request-level cache redirection, and multi-protocol compression logic 238 is configured to perform functions related to compression and decompression of data.

The high speed layer 2-7 integrated packet engine 240 includes a packet processing timer 242. In one embodiment, the packet processing timer 242 provides one or more time intervals to trigger the processing of incoming, i.e., received, or outgoing, i.e., transmitted, network packets. In some embodiments, the high speed layer 2-7 integrated packet engine 240 processes network packets responsive to the timer 242. The packet processing timer 242 provides any type and form of signal to the packet engine 240 to notify, trigger, or communicate a time related event, interval or occurrence. In many embodiments, the packet processing timer 242 operates in the order of milliseconds, such as for example 100 ms, 50 ms or 25 ms. For example, in some embodiments, the packet processing timer 242 provides time intervals or otherwise causes a network packet to be processed by the high speed layer 2-7 integrated packet engine 240 at a 10 ms time interval, while in other embodiments, at a 5 ms time interval, and still yet in further embodiments, as short as a 3, 2, or 1 ms time interval. The high speed layer 2-7 integrated packet engine 240 may be interfaced, integrated or in communication with the encryption engine 234, cache manager 232, policy engine 236 and multi-protocol compression engine 238 during operation. As such, any of the logic, functions, or operations of the encryption engine 234, cache manager 232, policy engine 236 and multi-protocol compression logic 238 may be performed responsive to the packet processing timer 242 and/or the packet engine 240. Therefore, any of the logic, functions, or operations of the encryption engine 234, cache manager 232, policy engine 236 and multi-protocol compression logic 238 may be performed at the granularity of time intervals provided via the packet processing timer 242, for example, at a time interval of less than or equal to 10 ms. For example, in one embodiment, the cache manager 232 may perform invalidation of any cached objects responsive to the high speed layer 2-7 integrated packet engine 240 and/or the packet processing timer 242. In another embodiment, the expiry or invalidation time of a cached object can be set to the same order of granularity as the time interval of the packet processing timer 242, such as at every 10 ms.

In contrast to kernel space 204, user space 202 is the memory area or portion of the operating system used by user mode applications or programs otherwise running in user mode. A user mode application may not access kernel space 204 directly and uses service calls in order to access kernel services. As shown in FIG. 2, user space 202 of appliance 200 includes a graphical user interface (GUI) 210, a command line interface (CLI) 212, shell services 214, health monitoring program 216, and daemon services 218. GUI 210 and CLI 212 provide a means by which a system administrator or other user can interact with and control the operation of appliance 200, such as via the operating system of the appliance 200 and either is user space 202 or kernel space 204. The GUI 210 may be any type and form of graphical user interface and may be presented via text, graphical or otherwise, by any type of program or application, such as a browser. The CLI 212 may be any type and form of command line or text-based interface, such as a command line provided by the operating system. For example, the CLI 212 may comprise a shell, which is a tool to enable users to interact with the operating system. In some embodiments, the CLI 212 may be provided via a bash, csh, tcsh, or ksh type shell. The shell services 214 comprises the programs, services, tasks, processes or executable instructions to support interaction with the appliance 200 or operating system by a user via the GUI 210 and/or CLI 212.

Health monitoring program 216 is used to monitor, check, report and ensure that network systems are functioning properly and that users are receiving requested content over a network. Health monitoring program 216 comprises one or more programs, services, tasks, processes or executable instructions to provide logic, rules, functions or operations for monitoring any activity of the appliance 200. In some embodiments, the health monitoring program 216 intercepts and inspects any network traffic passed via the appliance 200. In other embodiments, the health monitoring program 216 interfaces by any suitable means and/or mechanisms with one or more of the following: the encryption engine 234, cache manager 232, policy engine 236, multi-protocol compression logic 238, packet engine 240, daemon services 218, and shell services 214. As such, the health monitoring program 216 may call any application programming interface (API) to determine a state, status, or health of any portion of the appliance 200. For example, the health monitoring program 216 may ping or send a status inquiry on a periodic basis to check if a program, process, service or task is active and currently running. In another example, the health monitoring program 216 may check any status, error or history logs provided by any program, process, service or task to determine any condition, status or error with any portion of the appliance 200.

Daemon services 218 are programs that run continuously or in the background and handle periodic service requests received by appliance 200. In some embodiments, a daemon service may forward the requests to other programs or processes, such as another daemon service 218 as appropriate. As known to those skilled in the art, a daemon service 218 may run unattended to perform continuous or periodic system wide functions, such as network control, or to perform any desired task. In some embodiments, one or more daemon services 218 run in the user space 202, while in other embodiments, one or more daemon services 218 run in the kernel space.

Figure 2B:
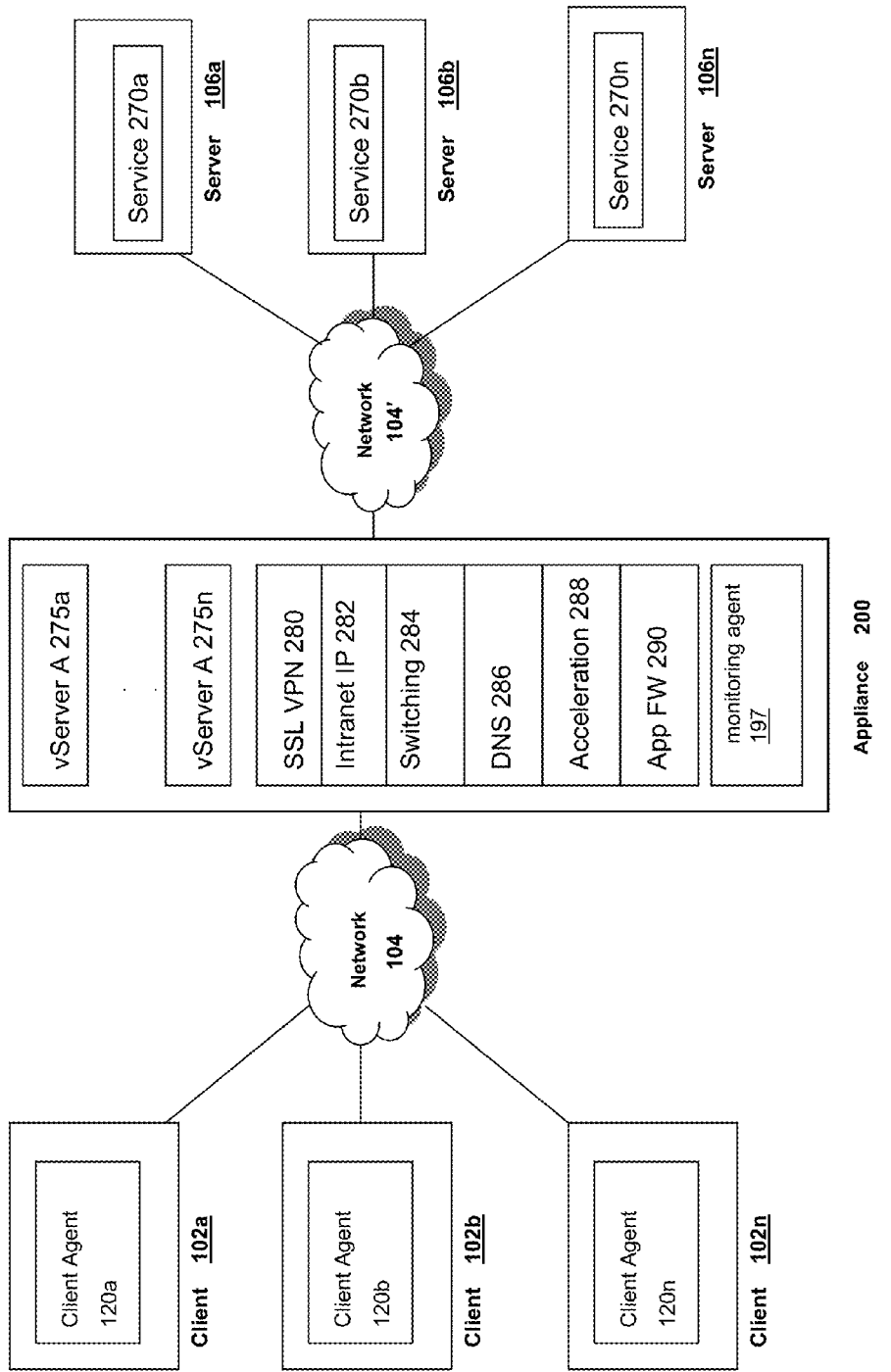
FIG. 2B is a block diagram of another embodiment of an appliance for optimizing, accelerating, load-balancing and routing communications between a client and a server.

Referring now to FIG. 2B, another embodiment of the appliance 200 is depicted. In brief overview, the appliance 200 provides one or more of the following services, functionality or operations: SSL VPN connectivity 280, switching/load balancing 284, Domain Name Service resolution 286, acceleration 288 and an application firewall 290 for communications between one or more clients 102 and one or more servers 106. Each of the servers 106 may provide one or more network related services 270a-270n (referred to as services 270). For example, a server 106 may provide an http service 270. The appliance 200 comprises one or more virtual servers or virtual internet protocol servers, referred to as a vServer, VIP server, or just VIP 275a-275n (also referred herein as vServer 275). The vServer 275 receives, intercepts or otherwise processes communications between a client 102 and a server 106 in accordance with the configuration and operations of the appliance 200.

The vServer 275 may comprise software, hardware or any combination of software and hardware. The vServer 275 may comprise any type and form of program, service, task, process or executable instructions operating in user mode 202, kernel mode 204 or any combination thereof in the appliance 200. The vServer 275 includes any logic, functions, rules, or operations to perform any embodiments of the techniques described herein, such as SSL VPN 280, switching/load balancing 284, Domain Name Service resolution 286, acceleration 288 and an application firewall 290. In some embodiments, the vServer 275 establishes a connection to a service 270 of a server 106. The service 275 may comprise any program, application, process, task or set of executable instructions capable of connecting to and communicating to the appliance 200, client 102 or vServer 275. For example, the service 275 may comprise a web server, http server, ftp, email or database server. In some embodiments, the service 270 is a daemon process or network driver for listening, receiving and/or sending communications for an application, such as email, database or an enterprise application. In some embodiments, the service 270 may communicate on a specific IP address, or IP address and port.

In some embodiments, the vServer 275 applies one or more policies of the policy engine 236 to network communications between the client 102 and server 106. In one embodiment, the policies are associated with a VServer 275. In another embodiment, the policies are based on a user, or a group of users. In yet another embodiment, a policy is global and applies to one or more vServers 275a-275n, and any user or group of users communicating via the appliance 200. In some embodiments, the policies of the policy engine have conditions upon which the policy is applied based on any content of the communication, such as internet protocol address, port, protocol type, header or fields in a packet, or the context of the communication, such as user, group of the user, vServer 275, transport layer connection, and/or identification or attributes of the client 102 or server 106.

In other embodiments, the appliance 200 communicates or interfaces with the policy engine 236 to determine authentication and/or authorization of a remote user or a remote client 102 to access the computing environment 15, application, and/or data file from a server 106. In another embodiment, the appliance 200 communicates or interfaces with the policy engine 236 to determine authentication and/or authorization of a remote user or a remote client 102 to have the application delivery system 190 deliver one or more of the computing environment 15, application, and/or data file. In yet another embodiment, the appliance 200 establishes a VPN or SSL VPN connection based on the policy engine's 236 authentication and/or authorization of a remote user or a remote client 103 In one embodiment, the appliance 102 controls the flow of network traffic and communication sessions based on policies of the policy engine 236. For example, the appliance 200 may control the access to a computing environment 15, application or data file based on the policy engine 236.

In some embodiments, the vServer 275 establishes a transport layer connection, such as a TCP or UDP connection with a client 102 via the client agent 120. In one embodiment, the vServer 275 listens for and receives communications from the client 102. In other embodiments, the vServer 275 establishes a transport layer connection, such as a TCP or UDP connection with a client server 106. In one embodiment, the vServer 275 establishes the transport layer connection to an internet protocol address and port of a server 270 running on the server 106. In another embodiment, the vServer 275 associates a first transport layer connection to a client 102 with a second transport layer connection to the server 106. In some embodiments, a vServer 275 establishes a pool of transport layer connections to a server 106 and multiplexes client requests via the pooled transport layer connections.

In some embodiments, the appliance 200 provides a SSL VPN connection 280 between a client 102 and a server 106. For example, a client 102 on a first network 102 requests to establish a connection to a server 106 on a second network 104'. In some embodiments, the second network 104' is not routable from the first network 104. In other embodiments, the client 102 is on a public network 104 and the server 106 is on a private network 104', such as a corporate network. In one embodiment, the client agent 120 intercepts communications of the client 102 on the first network 104, encrypts the communications, and transmits the communications via a first transport layer connection to the appliance 200. The appliance 200 associates the first transport layer connection on the first network 104 to a second transport layer connection to the server 106 on the second network 104. The appliance 200 receives the intercepted communication from the client agent 102, decrypts the communications, and transmits the communication to the server 106 on the second network 104 via the second transport layer connection. The second transport layer connection may be a pooled transport layer connection. As such, the appliance 200 provides an end-to-end secure transport layer connection for the client 102 between the two networks 104, 104'.

In one embodiment, the appliance 200 hosts an intranet internet protocol or intranetIP 282 address of the client 102 on the virtual private network 104. The client 102 has a local network identifier, such as an internet protocol (IP) address and/or host name on the first network 104. When connected to the second network 104' via the appliance 200, the appliance 200 establishes, assigns or otherwise provides an IntranetIP, which is network identifier, such as IP address and/or host name, for the client 102 on the second network 104'. The appliance 200 listens for and receives on the second or private network 104' for any communications directed towards the client 102 using the client's established IntranetIP 282. In one embodiment, the appliance 200 acts as or on behalf of the client 102 on the second private network 104. For example, in another embodiment, a vServer 275 listens for and responds to communications to the IntranetIP 282 of the client 102. In some embodiments, if a computing device 100 on the second network 104' transmits a request, the appliance 200 processes the request as if it were the client 102. For example, the appliance 200 may respond to a ping to the client's IntranetIP 282. In another example, the appliance may establish a connection, such as a TCP or UDP connection, with computing device 100 on the second network 104 requesting a connection with the client's IntranetIP 282.

In some embodiments, the appliance 200 provides one or more of the following acceleration techniques 288 to communications between the client 102 and server 106: 1) compression; 2) decompression; 3) Transmission Control Protocol pooling; 4) Transmission Control Protocol multiplexing; 5) Transmission Control Protocol buffering; and 6) caching. In one embodiment, the appliance 200 relieves servers 106 of much of the processing load caused by repeatedly opening and closing transport layers connections to clients 102 by opening one or more transport layer connections with each server 106 and maintaining these connections to allow repeated data accesses by clients via the Internet. This technique is referred to herein as "connection pooling".

In some embodiments, in order to seamlessly splice communications from a client 102 to a server 106 via a pooled transport layer connection, the appliance 200 translates or multiplexes communications by modifying sequence number and acknowledgment numbers at the transport layer protocol level. This is referred to as "connection multiplexing". In some embodiments, no application layer protocol interaction is required. For example, in the case of an in-bound packet (that is, a packet received from a client 102), the source network address of the packet is changed to that of an output port of appliance 200, and the destination network address is changed to that of the intended server. In the case of an outbound packet (that is, one received from a server 106), the source network address is changed from that of the server 106 to that of an output port of appliance 200 and the destination address is changed from that of appliance 200 to that of the requesting client 102. The sequence numbers and acknowledgment numbers of the packet are also translated to sequence numbers and acknowledgement expected by the client 102 on the appliance's 200 transport layer connection to the client 102. In some embodiments, the packet checksum of the transport layer protocol is recalculated to account for these translations.

In another embodiment, the appliance 200 provides switching or load-balancing functionality 284 for communications between the client 102 and server 106. In some embodiments, the appliance 200 distributes traffic and directs client requests to a server 106 based on layer 4 or application-layer request data. In one embodiment, although the network layer or layer 2 of the network packet identifies a destination server 106, the appliance 200 determines the server 106 to distribute the network packet by application information and data carried as payload of the transport layer packet. In one embodiment, the health monitoring programs 216 of the appliance 200 monitor the health of servers to determine the server 106 for which to distribute a client's request. In some embodiments, if the appliance 200 detects a server 106 is not available or has a load over a predetermined threshold, the appliance 200 can direct or distribute client requests to another server 106.

In some embodiments, the appliance 200 acts as a Domain Name Service (DNS) resolver or otherwise provides resolution of a DNS request from clients 102. In some embodiments, the appliance intercepts' a DNS request transmitted by the client 102. In one embodiment, the appliance 200 responds to a client's DNS request with an IP address of or hosted by the appliance 200. In this embodiment, the client 102 transmits network communication for the domain name to the appliance 200. In another embodiment, the appliance 200 responds to a client's DNS request with an IP address of or hosted by a second appliance 200'. In some embodiments, the appliance 200 responds to a client's DNS request with an IP address of a server 106 determined by the appliance 200.

In yet another embodiment, the appliance 200 provides application firewall functionality 290 for communications between the client 102 and server 106. In one embodiment, the policy engine 236 provides rules for detecting and blocking illegitimate requests. In some embodiments, the application firewall 290 protects against denial of service (DoS) attacks. In other embodiments, the appliance inspects the content of intercepted requests to identify and block application-based attacks. In some embodiments, the rules/policy engine 236 comprises one or more application firewall or security control policies for providing protections against various classes and types of web or Internet based vulnerabilities, such as one or more of the following: 1) buffer overflow, 2) CGI-BIN parameter manipulation, 3) form/hidden field manipulation, 4) forceful browsing, 5) cookie or session poisoning, 6) broken access control list (ACLs) or weak passwords, 7) cross-site scripting (XSS), 8) command injection, 9) SQL injection, 10) error triggering sensitive information leak, 11) insecure use of cryptography, 12) server misconfiguration, 13) back doors and debug options, 14) website defacement, 15) platform or operating systems vulnerabilities, and 16) zero-day exploits. In an embodiment, the application firewall 290 provides HTML form field protection in the form of inspecting or analyzing the network communication for one or more of the following: 1) required fields are returned, 2) no added field allowed, 3) read-only and hidden field enforcement, 4) drop-down list and radio button field conformance, and 5) form-field max-length enforcement. In some embodiments, the application firewall 290 ensures cookies are not modified. In other embodiments, the application firewall 290 protects against forceful browsing by enforcing legal URLs.

In still yet other embodiments, the application firewall 290 protects any confidential information contained in the network communication. The application firewall 290 may inspect or analyze any network communication in accordance with the rules or polices of the engine 236 to identify any confidential information in any field of the network packet. In some embodiments, the application firewall 290 identifies in the network communication one or more occurrences of a credit card number, password, social security number, name, patient code, contact information, and age. The encoded portion of the network communication may comprise these occurrences or the confidential information. Based on these occurrences, in one embodiment, the application firewall 290 may take a policy action on the network communication, such as prevent transmission of the network communication. In another embodiment, the application firewall 290 may rewrite, remove or otherwise mask such identified occurrence or confidential information.

Still referring to FIG. 2B, the appliance 200 may include a performance monitoring agent 197 as discussed above in conjunction with FIG. 1D. In one embodiment, the appliance 200 receives the monitoring agent 197 from the monitoring service 1908 or monitoring server 106 as depicted in FIG. 1D. In some embodiments, the appliance 200 stores the monitoring agent 197 in storage, such as disk, for delivery to any client or server in communication with the appliance 200. For example, in one embodiment, the appliance 200 transmits the monitoring agent 197 to a client upon receiving a request to establish a transport layer connection. In other embodiments, the appliance 200 transmits the monitoring agent 197 upon establishing the transport layer connection with the client 102. In another embodiment, the appliance 200 transmits the monitoring agent 197 to the client upon intercepting or detecting a request for a web page. In yet another embodiment, the appliance 200 transmits the monitoring agent 197 to a client or a server in response to a request from the monitoring server 198. In one embodiment, the appliance 200 transmits the monitoring agent 197 to a second appliance 200' or appliance 205.

In other embodiments, the appliance 200 executes the monitoring agent 197. In one embodiment, the monitoring agent 197 measures and monitors the performance of any application, program, process, service, task or thread executing on the appliance 200. For example, the monitoring agent 197 may monitor and measure performance and operation of vServers 275A-275N. In another embodiment, the monitoring agent 197 measures and monitors the performance of any transport layer connections of the appliance 200. In some embodiments, the monitoring agent 197 measures and monitors the performance of any user sessions traversing the appliance 200. In one embodiment, the monitoring agent 197 measures and monitors the performance of any virtual private network connections and/or sessions traversing the appliance 200, such an SSL VPN session. In still further embodiments, the monitoring agent 197 measures and monitors the memory, CPU and disk usage and performance of the appliance 200. In yet another embodiment, the monitoring agent 197 measures and monitors the performance of any acceleration technique 288 performed by the appliance 200, such as SSL offloading, connection pooling and multiplexing, caching, and compression. In some embodiments, the monitoring agent 197 measures and monitors the performance of any load balancing and/or content switching 284 performed by the appliance 200. In other embodiments, the monitoring agent 197 measures and monitors the performance of application firewall 290 protection and processing performed by the appliance 200.

C. Clientless Virtual Private Network Environment

Figure 3A:
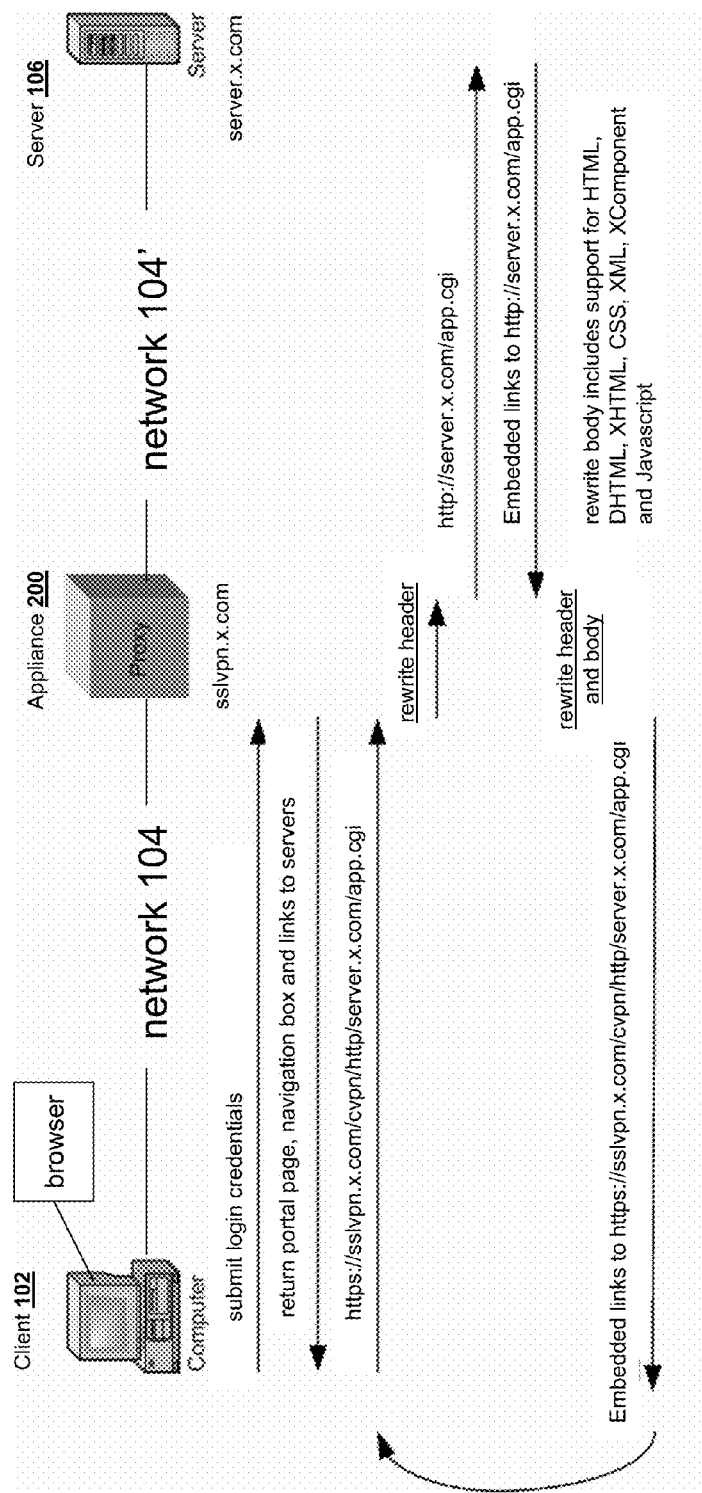
FIGS. 3A and 3B are block diagrams of an embodiment of a clientless virtual private network access to a server via the appliance.

Referring now to FIG. 3A, an embodiment of a clientless virtual private network (VPN) environment for accessing a server via an appliance 200 or proxy is depicted. In brief overview, the client 102 operates on computing device 100 and executes a browser operated by a user. The client 102 may be on a first network 104, such as a public network. A user on the client 102 may request via the browser access to a resource on a second network 104', such as a private network of an enterprise. The appliance 200 provides the user a clientless VPN access to the requested resource. The client may not install, execute or otherwise any agent, component, program, driver or application that is constructed and/or designed to provide VPN connectivity (referred to as client based VPN) to the network 104'. Instead, the appliance or proxy may rewrite responses from the server and requests from the client to provide VPN functionality without the user of a VPN agent operating on the client. For example, the appliance may rewrite Uniform Resource Locators (URLs) between the client and server, such as URLs in any content server by the server or requests transmitted by the client. The appliance 200 may rewrite URLs between the client and the server in a manner transparent and seamless to either or both of the client and the server. As such, the client, browser or server and server application do not need to have knowledge or be aware of the clientless SSL VPN access scenario.

A virtual private network (VPN) may be any network using public telecommunication infrastructure, such as the internet, to provide remote clients, servers or other communicating devices with an access or connection into a private network, such as from a public network. A virtual private network (VPN) is a way to use a public telecommunication infrastructure, such as the Internet, to provide remote users with access to an enterprise or private network. In some embodiments, the access is secure via encryption or tunneling. In some embodiments, the intermediary described herein provides a secure virtual private network connection from a first network of the client to the second network of the server.

A Secure Socket Layer (SSL) VPN may use SSL or TLS or any other type and form of secure protocols to establish the connection with a level of security. In some embodiments, an SSL VPN may use any type and form of encryption for establishing or maintaining secure access. An SSL VPN may be established and/or accessed via a browser such as using HTTPS (Secure HyperText Transfer Protocol). An SSL VPN may be established or provided by an SSL enabled browser or application.

The SSL VPN connection or session may be established or provided by either using a client based or clientless approach A client based SSL VPN may be use any type and form of client agent or any software related agent on the client 102 to establish a SSL VPN connection or session. For example, a client based SSL VPN may be provided via an SSL VPN client agent downloaded to the client, such as downloaded from an appliance. The client agent may be designed and configured to establish and provide the SSL VPN functionality, connection and access between the client and the appliance or server.

A clientless SSL VPN may be any SSL VPN that does not use an SSL VPN client agent, software or programs downloaded and installed on the client 102 to establish the SSL VPN connection or session. In some embodiments, a clientless SSL VPN may be any SSL VPN that does not require a client 102 to install or execute a predetermined software or an executable file designed and constructed to provide SSL VPN functionality in order to establish an SSL VPN connection with another network device. In some embodiments, a clientless SSL VPN is established via an SSL enabled browser that has not downloaded or does not require the use of a VPN or SSL VPN client agent. A clientless SSL VPN connection or session may use the protocols and communications of a standard browser or application, such as an SSL enabled browser. A clientless SSL VPN connection or session may be provided by an intermediary or appliance as described herein that translates, rewrites or transforms content of requests and responses between a first network and a second network.

The appliance 200 may provide via an SSL VPN 280 module, previously described herein, a facility for accessing a resource. In one embodiment, the appliance 200 provides a client based access to a network by providing, installing or executing an SSL VPN agent on the client 102 for communicating with the appliance 200. In some embodiments, the appliance 200 provides for clientless SSL VPN access to a resource, such as an http/https/file share, without having to download an SSL VPN client or agent to the client 102. For example, a user may want to access the resources within company from an outside machine such at a kiosk on which he does not have privilege to install the client or does not want to go through the client installation process. The clientless SSL VPN feature is also useful when the SSL VPN client is not supported for the device (e.g. new PDA in market) but the device run an SSL enabled browser. In other embodiments, the appliance 200 chooses for a user between client-based and clientless SSL VPN access to the resource based on policy and any policy rules, actions and/or conditions.

The client may include any type and form of user agent which may be a browser, editor, spider (web-traversing robots), or any other end user tool or program. The client 102 may include any type and form of browser. In one embodiment, the browser is any version of Internet Explorer manufactured by Microsoft Corporation of Redmond, Wash. In another embodiment, the browser is any version of the Netscape browser manufactured by the Netscape Communications Corporation. In other embodiments, the browser is any version of the open source browser referred to as Firefox and provided by Mozilla Foundation of Calif. and found at www.mozilla.com. In yet another embodiment, the browser is any version of the browser referred to as Opera manufactured by Opera Software ASA of Oslo, Norway. In some embodiments, the client 102 executes or includes any type and form of application or program for displaying web pages, web content, HTML, XML, CSS (Cascading Style Sheets), JavaScript or HTTP content.

In operation of the embodiment depicted by FIG. 3A, a user logs in at the SSLVPN site provided by the appliance 200, such at a domain name and IP address hosted by the appliance 200. For example, the user via a browser of the client 102, may select or enter a URL to the SSL VPN site. The appliance 200 may authenticate the user and may further determine authorization of the user to access the appliance 200 or the SSL VPN site. After successful authentication, the appliance serves a portal page to the client to display to the user via the browser. The portal page may include a navigation box, such as a set of one or more user interface elements for a user to select to operate or run an application. The portal page may include links to other pages or URLs to which the user may have access. The URLs or links on the portal page may reference or identify the host name or IP address of the SSL VPN site provided by the appliance 200.

The user via the portal page may select one or more URLs, for example, by clicking on an active hyperlink or URL. In response, the browser or client transmits a request to the domain hosted by the appliance 200. For example, as depicted in FIG. 3A, the user may request an application of the server 106 via the appliance: "https://sslvpn.x.com/cvpn/http/server.x.com/app.cgi". In some embodiments, the user sends another request, such as for example "https://proxy.x.com/cvpn/http/server.x.com/app.cgi". The appliance 200 receives the request from the client 102 and rewrites the request to transmit to the server. For example, as depicted in FIG. 3A, the appliance may remove or strip the domain name hosted by the appliance such as "sslvpn.x.com" or "proxy.x.com" and forward the remaining portion of the request to the server 106.

In response to the request, the server serves content to the client. The content or body of the response may include embedded links or URLs to other pages of the server or to other servers on the network 104', such as embedded links to "http://server.x.com/app.cgi". The appliance rewrites the header and body to modify any URLs to reference the domain name or IP address of the SSL VPN site so that any further URL or link selection via the browser of the client communicates requests to the appliance 200. The appliance communicates the modified content to the client 102. The appliance 200, such as via the AppFw 290, sometimes referred to as AppSecure module 290, may be designed and constructed to rewrite URLs of requests and responses based on policy of a policy engine. The links (URLs) in that page and other pages received subsequently from the server during this SSL VPN session are modified by the appliance in such a way that the links point to the SSLVPN site (VPN VIP 275) and the original request URL (absolute or relative) is encoded within that request URL.

Figure 3B:
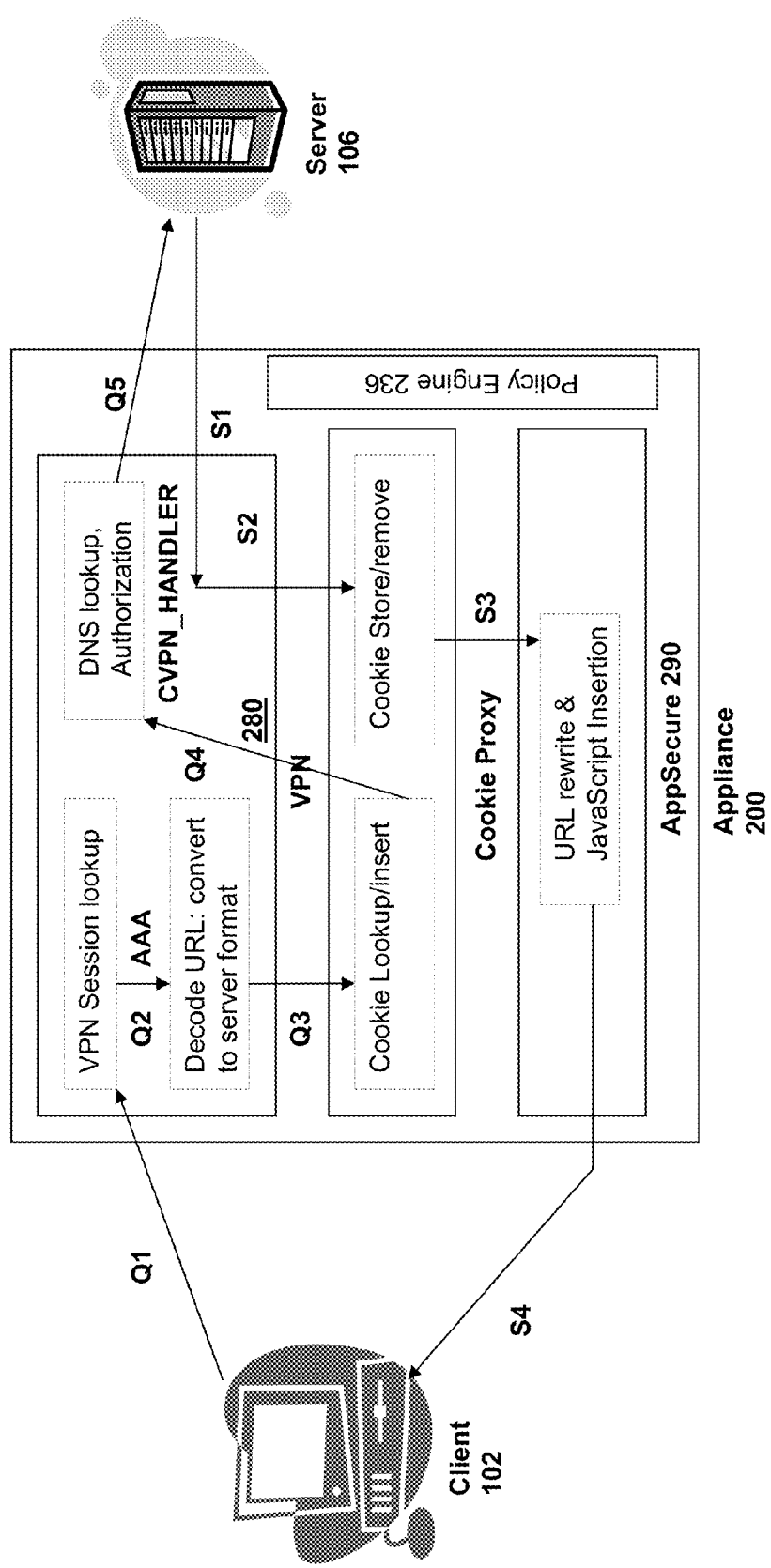

Referring now to FIG. 3B, another embodiment of a VPN environment for providing VPN access as well as cookie management is depicted. In brief overview, the appliance 200 may include a VPN module 280 for handling any of the SSL VPN functionality, clientless and/or client based, as described herein. The appliance and/or VPN module 280 may have an AAA module to perform any type and form of authentication, authorization and auditing (AAA) and/or to track and manage VPN session information. The AAA module may also perform any type and form of VPN session look to determine the VPN session for any client request. The VPN module may also perform an URL decoding and covert the URL to server format, such as to submit to a server on the private network. VPN module 280 also includes DNS lookup functionality and authorization via VPN handler function, logic or operation.

The appliance may include a cookie proxy or cookie manager for storing, tracking and managing cookies between the client and the server. The cookie may include cookie storage, referred to as a cookie jar for adding or inserting cookies as well as removing cookies. The cookie manager or proxy may include functions, logic or operations to store and look up cookie information in a cookie jar by URL, domain name or other information of the request and/or response. In some embodiments, the appliance 200 manages cookies on the behalf of clients that do not support cookies, disabled cookies or for cases where it may be desired or preferred not to send cookies to the client.

The appliance may also include an AppFW 280 also referred to as AppSecure in the context of an appliance manufactured by Citrix Systems, Inc. The AppSecure 280 module may include logic, functions or operations for perform any type and form of content rewriting, such as URL rewriting. In some embodiments, the AppSecure 280 module performs any type and form of content injection into a request and/or response between a client and a server. In one embodiment, the AppSecure module 280 injects scripts into a response to the client, such as a JavaScript, to perform any type and form of desired functionality.

Any of the components of the appliance 200 used for clientless SSL VPN access may be responsive to or driven by configuration, such as via any one or more policies of the policy engine. The policies may direct and determine the type and form of URL encoding and decoding performed by the VPN module. In some embodiments, the policies may direct and determine how and when the cookie proxy manages and proxies cookies. In other embodiments, the policies may direct and determine how and when the AppSecure module performs URL rewriting and/or content injection. The policies may direct the way a user access the private network and applications on the private networks. Policies may be configured based on access scenarios, which can include access based on any combination of a user, type and form of client, type and form of network, type of resources accessed, types of applications used, temporal information as well as any information that may be determined by the appliance via network traffic traversing thereto.

With reference to FIG. 3B, a flow of packets via the appliance 200 for clientless SSL VPN access is discussed. In response to a successful login request, the VPN appliance may send a portal page to the sender of the login request. The portal page may have one or more links in "vpn encoded form" as described in connection with FIG. 3A. The portal page flows through the response code path described below. When a user clicks on any of the URLs in the portal page, the packet flow may be implemented in a number of ways and using a number of steps. In some embodiments, for request path at step Q1, the appliance 200 may receive a URL request and look up the VPN session in the AAA module. At step Q2, the appliance may decode the VPN encoded URL to the expected URL for the server or the network 104'. The appliance may also modify the header of the request, such as the header values, to server format, or a format intended for transmission and use by the server 106, such as the HTTP server for example. The appliance may reparse the header so that any other modules of the appliance see the request in the server format. At step Q3 in the request path, the appliance via the cookie manager or proxy may look up the cookie for the request based on the domain and path of the URL. In some cases, if the request should include a cookie, the appliance may insert the cookie from a cookie jar. At step Q4, the appliance may resolve the domain name of the server present in the URL into an IP address of the server via a DNS lookup function/module of the appliance. The appliance may create server information based on the DNS lookup in the AAA module. In addition, authorization policies may be evaluated to determine if the request may be transmitted to the server. At step Q5 the appliance may send the request to the server. In some embodiments, the appliance sends the request to the server provided that the authorization is successful.

In the response path from the server to the client via the appliance, at step S1, the appliance may receive the response from the server. The VPN module 280 may process the response. The VPN module may pass the response header to the cookie proxy module and the response body to the AppSecure module. At step S2, the cookie proxy may remove cookies from the header of the response that are not configured or otherwise identified as client consumed cookies and store them in a cookie jar used for the current session. At step S3, the AppSecure module may rewrite any URL in "vpn encoded form" as per rewrite policies. The AppSecure module may also insert into the response body any scripts, such as JavaScript code to be executed at client side. At step S4, the appliance may send the modified response to the client. In many embodiments, any of the Q or S steps happen in any order or in any combination with any other steps or embodiments described herein.

D. Systems and Methods for Configuration and Fine Grain Policy Driven Web Content Detection and Rewrite Referring now to FIG. 4, a view of a system for configuration and policy driven web content detection and rewrite is depicted. In brief overview, the system comprises the client 102 in communication with the appliance 200. In one embodiment, the appliance 200 includes a policy engine 236, a SSL VPN module 280, an URL rewriter 430 and a database 440. In another embodiment, the policy engine further comprises clientless policies 405, client based policies 410 and one or more access profiles 415A-415N (in general referred to as access profiles 415). The appliance 200 is in communication with the server 106. In one embodiment, one or more applications 420a-420n (in general referred to as applications 420) execute on one or more servers 106. The client 102 transmits a URL request 401 which is intercepted at the appliance 200. The appliance 200 modifies the request 401 and forwards the modified request 401' to the server 106.

In one embodiment, the request 401 transmitted by the client 102 includes a URL link for a SSL VPN site provided by the appliance. In another embodiment, the request 401 is a URL request for a site that is outside of the SSL VPN. In still another embodiment, the request 401 includes authentication data required to access the SSL VPN. In yet another embodiment, the request 401 is transmitted in response to the user accessing a link on a portal page received at the client after successful authentication to the SSL VPN. In some embodiments, the request 401 comprises a URL for one or more of the following: web pages, static images, animated images, audio files and video files. In some embodiments, the request 401 comprises a URL accessing a resource, application or service stored on one or more servers 106 on a secured network. The request may include a URL for accessing resources, applications or services that is different from, but associated with the URL that the server 106 being accessed recognizes or accepts. In some embodiments, the requests from the client 102 are rewritten, modified or transformed before being forwarded to the server 106.

In some embodiments, the URL included in the request 401 may be of the general form: <scheme name>:<hierarchical part>[?<query>][#<fragment>] The scheme name generally identifies the protocol associated with the URL. The scheme name may include but is not limited to the following: http (Hyper Text Transfer protocol), https (Secure http), aaa (diameter protocol), aaas (secure aaa), dns (Domain Name System), imap (Internet Message Access Protocol), ftp (File Transfer Protocol), ldap (Lightweight Directory Access Protocol), news (newsgroup protocol), telnet (TELecommunication NETwork protocol), nntp (Network News Transfer Protocol) and pop (Post Office Protocol). The URL may include any type and form of portion of URL or URL related text, such as for example: "http://www.xyz.com/xyz/xyzpage-.htm" or "ftp://ftp.xyz.com/xyz/xyztext.txt", "ldap://[1985:db8::7}/f=GB?objectClass?one".

The hierarchical part is intended to hold identification information hierarchical in nature. In one embodiment the hierarchical part begins with a double forward slash ("//"), followed by an authority part. In some embodiment, the hierarchical part contains path information locating a resource on the network. In another embodiment, the authority part includes a hostname. In still another embodiment, the authority part includes an optional user information part terminated with "@" (e.g. username:password@). In one embodiment, the query part comprises information that is not hierarchical in nature. In another embodiment, the fragment part includes additional identifying information which allows indirect identification of a secondary resource.

The appliance 200 may intercept the URL request 401 and pass the request to the SSL VPN module 280. In one embodiment, the SSL VPN module 280, in communication with the policy engine 236, decides whether to rewrite the URL or not. In some embodiments, the URL rewrite policies can be configured to provide a desired granularity. In one of these embodiments with a finer level of granularity, the SSN VPN module 280 decides whether the client 102 requesting access to the SSL VPN be granted clientless access or client based access in response to a policy provided by the policy engine 236. In some embodiments, the SSN VPN module decides on the clientless access or client based access based on one or more conditions of the policies 405 or 410. In one of these embodiments, the client 102 may be a machine not allowing the user to download the SSL VPN client. In another of these embodiments, the client 102 is a device that does not support the SSL VPN client but is enabled to run a SSL enabled browser. In still another of these embodiments, the SSL VPN module 280 may perform end point scanning to determine that the client 102 does not support client based policies 410 based on one or more of the following: incompatible operating system, firewall and anti-virus software.

In some embodiments, the appliance 200 identifies a policy based on any portion of the request 401. A request 401 may comprise a portion that indicates or helps indicate the policy the appliance 200 will identify or choose. In some embodiments, the appliance 200 identifies a policy based on a header of the network packet. In other embodiments, the appliance 200 identifies a policy based on a payload portion of the network packet. In still other embodiments, the appliance 200 identifies a policy based on another policy. In one embodiment, the appliance 200 may act as a transparent proxy based on an identified policy. In some embodiments the appliance 200 switches between policies to grant clientless or client based access depending on a security condition of the network. By way of example, in one embodiment, the appliance 200 may identify a policy to grant clientless access if a presence of an antivirus software or firewall is not detected, but switch to the client based mode once the antivirus software or firewall is detected to be operational.

The appliance 200 may identify a policy based on any detail, information or indication from the request. In some embodiments, the appliance 200 identifies a policy based on the user on the client 102 that has sent the request. For example, a user may be designated to use a clientless SSL VPN session instead of client based SSL VPN sessions, or vice versa. In further embodiments, the appliance 200 identifies a policy based on the application, the resource or the service the client 102 has requested from the server 106. For example, some applications are accessed by the clients using only client based or clientless SSL VPN sessions. In further embodiments, the appliance 200 identifies a policy based on an information about the client 102. The information about the client may comprise a history of client's interactions with the server 106 or related servers, permissions for the client to access specific resources on the server 106, client's authentication to access specific resources on the server 106 or any other client to server interaction related information. In some embodiments, the appliance 200 identifies a policy based on the server 106 the client 102 is accessing. For example, some servers may use or provide client based SSL VPN sessions, while other may use or provide clientless SSL VPN sessions. In some embodiments, identification of a policy is based on any portion of a network packet associated with the request 401. In some embodiments, the appliance 200 identifies a policy based on one or more Regular Expressions, or RegExs. In further embodiments, the client's request is matched with, or compared against any number of RegExs that may include any number of characters, strings, portions of text or portions of URLs for identifying policies or identifying specific URLs or portions of the request. Based on the results of the matching or comparisons between the portions of the request from the client and RegExs, the appliance 200 may identify the policy.

In one embodiment, the clientless policies 405 may be configured to provide a desired level of granularity. In one embodiment, the clientless policies 405 may be configured based on a user profile. In another embodiment, the policies 405 may be configured based on a user or a group of users. In some embodiments, the policies may be configured based on one or more of a network type, IP address and request type. In some embodiments, the policies 405 are configured based on an application, resource or service being requested or being accessed by the client. In further embodiments, the policies 405 are configured based on other policies. In other embodiments, a plurality of policies may be logically grouped together.

In one embodiment, the configuring is done through an application programming interface (API) such as AppFW 290 also referred to as AppSecure. In other embodiments, command line interface (CLI) commands are used to configure clientless policies 405 of SSL VPN. In one of these embodiments, a CLI command such as the following is used to configure the clientless SSL VPN globally:

set vpn parameter-ClientLessVpnMode on

In another of these embodiments, the clientless SSL VPN provides a finer granularity via a session action. In one embodiment, the following CLI command can be used to enable the clientless SSL VPN in a session action:

add vpn session action<actionname>-ClientLessVpn-Mode on

In some embodiments, the clientless SSL VPN policies 405 are configured to specify a URL encoding mechanism. In one of these embodiments, the clientless policies 405 are configured to specify a URL encoding mechanism at the global level using the following CLI command:

set vpn param-ClientLessModeUrlEncoding (opaque|transparent|encrypt)

In one embodiment, the 'opaque' mode involves encoding of the hostname portion of the URL such that the user does not see the hostname in clear text. In another embodiment, the 'transparent' mode involves no encoding such that the user can see which host is being accessed. In still another embodiment, the user can see both the hostname and the path information of the URL in the 'transparent' mode. In yet another embodiment, the 'encrypt' mode involves encryption of one or more portion of the URL. In one embodiment, the hostname and the path information are encrypted in the 'encrypt' mode. In another embodiment, the encryption is done using a session key of a symmetric encryption mechanism. In still other embodiments, the encryption can be done using a plurality of encryption mechanism as apparent to one skilled in the art.

In some embodiments, the URL encoding mechanism is specific to a session policy. In one of these embodiments, the URL encoding mechanism may be configured specific to a user. In another of these embodiments, the URL encoding mechanism may be configured specific to a group. In still another of these embodiments, the URL encoding mechanism can be configured specific to a virtual server (vserver). In one embodiment, the URL can be configured specific to a session policy as a parameter in the session policy's action. This may be achieved using a CLI command such as:

add vpn session action <action name>-ClientLessModeUrlEncoding (opaque|transparent|encrypt)

In some embodiments, finer granularity is provided in clientless SSL VPN with the clientless policies 405 using one or more access profiles 415. In one embodiment, an access profile 415 includes rewrite labels to instruct the rewriter 430 about rewriting policies. Rewrite policies may include instructions to rewrite or modify each URL from within the content or transmission of the server 106 or the client 102 traversing the appliance 200. For example, a rewrite policy for a specific URL may provide instructions to rewrite, overwrite, modify or add any portion of the URL from the content of the client 102 or server 106. In some embodiments, a rewrite policy may provide instructions to exclude or cut out any portion of the URL from the content of the client 102 or server 106. In another embodiment, the access profile 415 includes a pattern class (referred to as patclass) for detecting URLs. In still another embodiment, the patclasses are comprised of, or include Regular Expressions (RegEx). Regular Expressions may include any combination of characters, numbers and symbols to be used for detecting one or more URLs traversing the appliance 200. In some embodiments, RegEx includes one or more portions or sections of URLs or parts of the URLs to be used for detecting one or more specific URLs within the content sent to the client 102 by the server 106. In further embodiments, Regular Expressions include text, scripts, characters and numbers used for matching against or detecting one or more URLs within specific types of content. The content may be any type and form of content provided by the server 106 to the client in response to the request of the client 102. In yet another embodiment, the RegEx comprises a set of key combinations to facilitate a variety of control over search strings for URLs. In another embodiment, the access profile 415 includes one or more patclasses containing names of cookies to be passed to the client. In one embodiment, the access profile can be created using a CLI command such as the following:

```
set vpn clientlessAccessProfile <profileName>
[-URLRewritePolicyLabel <string>]
[-JavaScriptRewritePolicyLabel <string>]
[-ReqHdrRewritePolicyLabel <string>]
[-ResHdrRewritePolicyLabel <string>]
[-RegexForFindingURLinJavaScript <string>]
[-RegexForFindingURLinCSS <string>]
[-RegexForFindingURLinXComponent <string>]
[-RegexForFindingURLinXML <string>]
[-ClientConsumedCookies <string>]
```

In another embodiment, the access profile 415 is linked to the clientless access policies 405 to provide fine granularity. In still another embodiment, the clientless access policy 405 is linked to the access profile 415 using a CLI command such as the following:

add vpn clientlessAccessPolicy <policyName><rule><vpnclientlessAccessProfile>

The access policy 415 selects the access profile 415 if the rule evaluates to TRUE.

In some embodiments, the access profile 415 is associated with one or more of a plurality of applications 420a-420n (in general referred to as applications 420). For example, access profiles 415 maybe configured to a predetermined application 420. In one embodiment, there may be one global access profile configured for a group of applications 420. In another embodiment each application 420 may have a separate access profile 415 associated with it. In still another embodiment, an access profile 415 associated with an application 420a is used for all versions of the application 420a. In yet another embodiment, there may be separate access profiles associated with each version of an application 420a. In some embodiments there may be one or more access profile 415 associated with another access profile 415. In other embodiments access profiles could be specific to one or more of a user, an application, a group of user and a group of applications. In still other embodiments, access profiles 415 may be configured according to a desired granularity level as apparent to one skilled in the art.

Figure 4:
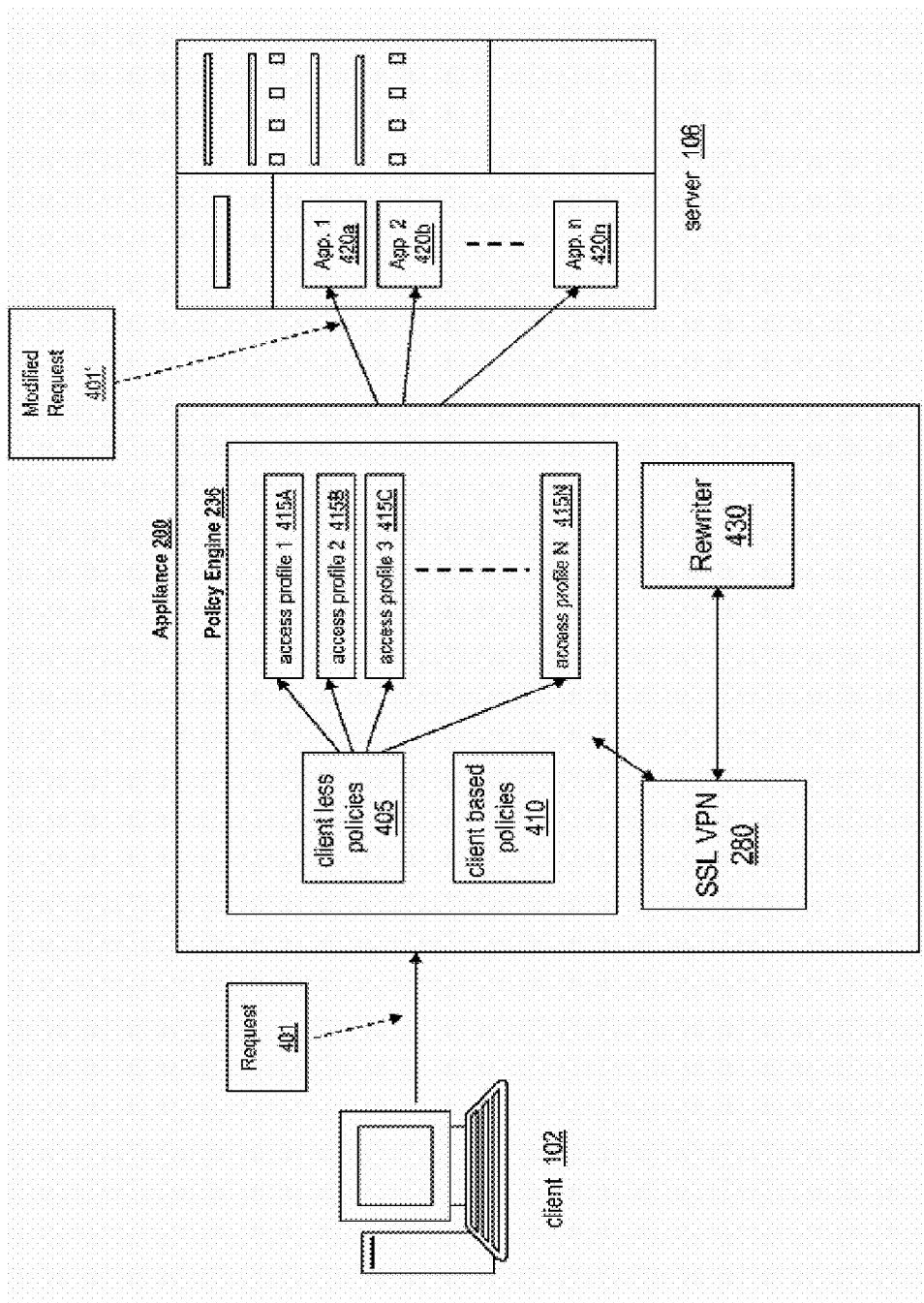
FIG. 4 is a block diagram of an embodiment of an appliance between a client and a server performing URL rewrite.

In one embodiment, the application 420 is an email application including but not limited to Outlook Web Access (OWA) 2003 and OWA 2007 manufactured by Microsoft Corporation of Redmond, Wash. In another embodiment, the application 420 can be a document management platform such as Sharepoint 2007 manufactured by Microsoft Corporation of Redmond, Wash. In still other embodiments, the application 420 can be any other software or program as apparent to one skilled in the art. In FIG. 4, all the applications 420 are shown to be executing on the server 106. In other embodiments, the applications 420 may be executing on different servers. In still other embodiments, the applications 420 may be executing on one or more servers of a logically grouped server farm.

In some embodiments, the SSL VPN clientless policies 405 are bound to one or more VPN entities. In one embodiment, the clientless policies 405 is bound to VPN global. In another embodiment, the clientless policies 405 are bound to a VPN vserver. In still another embodiment the clientless policies 405 are bound to a user of Authentication, Authorization and Accounting (AAA) protocol. In yet another embodiment, the clientless policies 405 are bound to a AAA group. In some embodiments, the clientless policies 405 are bound to a VPN entity using a CLI command such as the following:

bind <entity>-policy <clientlessAccesspolicyName>-priority <pri>

In one embodiment, the SSL VPN module 280 communicates with the URL rewriter 430 to inform the URL rewriter 430 about rewrite policies obtained from the policy engine 236. In another embodiment, the URL rewriter directly communicates with the policy engine 236 to obtain rewrite policies. The rewrite policies may include instructions or directions to transform, modify or overwrite any specific URL transmitted by the server 106 or the client 102. In some embodiments, the rewrite policies provide instructions or directions to modify or rewrite a specific URL into another URL. The modifications, changes or transformations may include any combination of rewriting, overwriting, cutting and pasting, encrypting, replacing or otherwise transforming a specific URL, or any portion of the specific URL. In some embodiments, the rewriter 430 rewrites the URL in the request 401 and forwards the modified URL to the server 106. In one embodiment, the rewriter 430 rewrites the whole URL except the extension type of a file in order to allow a browser to derive the MIME type. In another embodiment, the rewriter 430 rewrites the hostname to make the hostname a sub-directory under the SSL VPN site. In still another embodiment, the rewriter rewrites the absolute URL keeping the relative URLs unchanged. In yet another embodiment, the rewriter 430 rewrites the hostname and the relative URLs. The rewriter 430 can do the rewriting in one or more of a plurality of ways. In one embodiment, the rewriter 430 encodes a URL such as http://www.unencoded_url.com under a SSL VPN site such as http://www.sslvpn.com as http://www.sslvpn.com/9oatj. In another embodiment, the rewriter 430 uses some session key to symmetrically encrypt and decrypt the URL. Such encryption of URL is referred to as obfuscation. In one embodiment, the file extension type and/or the SSL VPN hostname is not encrypted by the rewriter 430. In another embodiment, the rewriter 430 encrypts the path information to shield the directory structure at the server. In one embodiment the key used for encryption and decryption is provided by the SSL VPN module. In another embodiment, the key is derived using a session id. By way of example, a URL http://www.unencoded_url.com/testsite/contents/file5.html is encrypted to another URL such as: https://svpn.mysite.com/EURL/whhyghfgdyonfdnv9898aaf.html. In one embodiment, a known encoding and decoding scheme may be used in order to facilitate bookmarking the URL for future SSL VPN sessions. In another embodiment, the rewriter 430 rewrites an original URL for a SSL VPN site using a reversible transformation. In such an embodiment, the original URL can be easily extracted from the rewritten URL. By way of example, a URL http://www.xyz.com/htmil/index.html may be rewritten as the URL:/cvpn/http/www.xyz.com/html/index.html.

The intermediary 200 may apply any of the access profiles, policies, rules and actions to any level of granularity of portions or subsets of network traffic traversing the intermediary 200. The level of granularity may range from fine to coarse based on the configuration. The logic, criteria or conditions of rules of access profiles, rules and policies described herein may be defined or specified to apply to any desired subset or portion of network traffic or transmissions transmitted via the appliance 200. In one aspect, the level of granularity refers to a degree, measurement, fineness or coarseness of portions of network traffic to which the configuration may apply. In very broad or coarse granularity of configuration, an access profile, rule or a policy may apply to all network traffic. In a very fine granularity configuration, an access profile or policy may apply to a specific subset of network traffic of a particular user, such a traffic or portions of traffic of a particular application of a particular user.

In some granularity configurations, an access profile, policy or a rule applies to any client 102 sending a request to a server. The policy, rule or access profile may be defined to address, or apply to any client 102, and may be based on any configuration of the client 102 or information relating the client 102, such as for example a portion the client 102 request. Similarly, the policy, rule or access profile may be defined to address, or apply to any server 106, and may be based on any configuration of the client 106 or information relating the server 106, such as for example a portion the server 106 response. In some granularity configurations, an access profile, policy or a rule is defined to apply to a specific session or connection the client 102 is using to connect to the server 106, via the appliance 200.

In further embodiments, an access profile, policy or a rule is defined to apply to any client 102 the is connected via SSL VPN session or connection. In further embodiments, an access profile, policy or a rule is defined to apply to any client 102 that is connected via clientless SSL VPN session or connection. In still further embodiments, an access profile, policy or a rule is defined to apply to any client 102 that is connected to via client based SSL VPN session or connection. In still further embodiments, an access profile, policy or a rule is defined to apply to any client 102 or client session that sends a request to a particular server 106. In yet further embodiments, an access profile, policy or a rule is defined to apply to any client 102 or client session that requests a particular application or a resource on the server. In further embodiments, an access profile, policy or a rule is defined to apply to any client 102 or client session based on the cookie configuration, for example if the cookies are enabled or disabled.

In still further embodiments, an access profile, policy or a rule is defined to apply to any client 102 or client session that sends a request that includes a particular URL, or a portion of a particular URL. In yet further embodiments, an access profile, policy or a rule is defined to apply to any client 102 or client session based on a match between a portion of the request sent by the client 102 and a phrase or a key of the access profile, policy or the rule. In some embodiments, an access profile, policy or a rule is defined to apply to any server 106 or a server session based on an information relating a client 102 accessing the server 106. Such information may include a portion or feature of the request of the client 102, a setting or configuration of the client 102, or any other client 102 related information. In some embodiments, an access profile, policy or a rule is defined to apply to any server 106 or server session based on the configuration of the server 106 or the features of the content that the server 106 is transmitting to the client 102.

Figure 5:
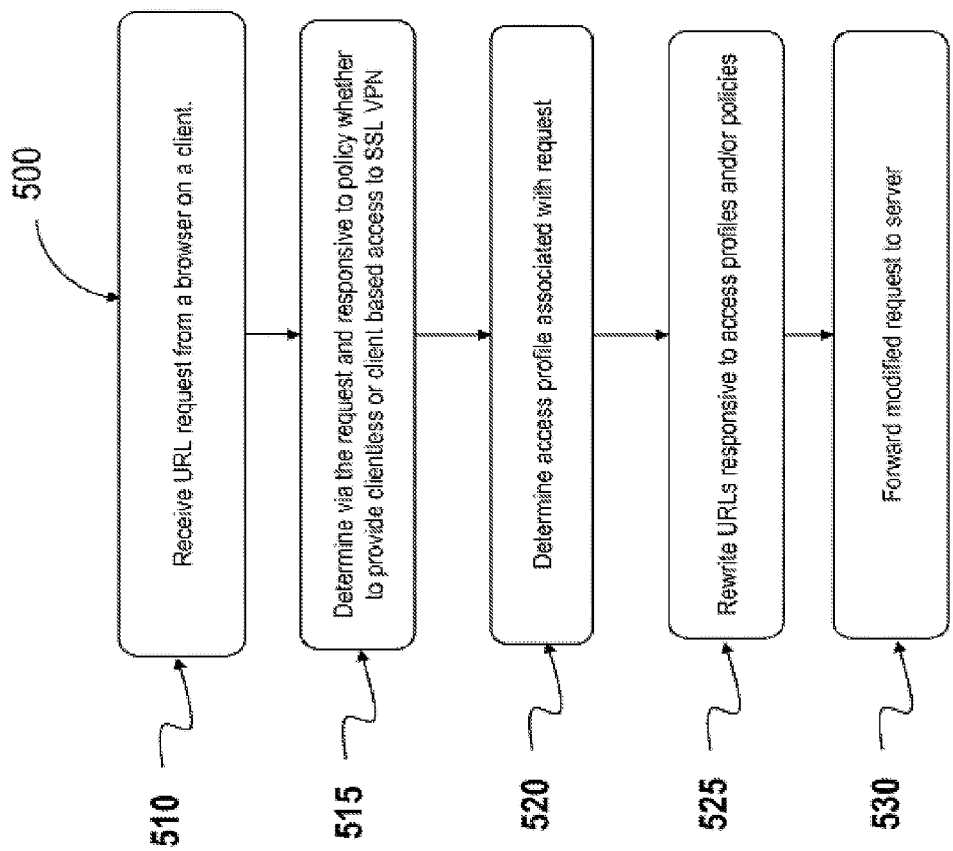
FIG. 5 is a flow diagram of steps taken at an appliance in an embodiment of a method to perform URL rewriting on a client request.

Referring now to FIG. 5, a flow diagram depicting the steps of an embodiment of a method 500 taken at the appliance 200 to perform URL rewriting is shown. The appliance 200 receives (step 510) URL request from a browser on a client. A SSL VPN module 280 residing on the appliance 200 decides (step 515) via policy whether to provide clientless or client based access to the SSL VPN. The policy engine 236 further determines (step 520) if there is an access profile 415 associated with the request. The URL rewriter 430 residing on the appliance 200 rewrites (step 525) URLs responsive to the access profile and/or policies. The appliance 200 forwards (step 530) the modified request to the server 106.

In one embodiment, the appliance 200 receives (step 510) the URL request from a client over a network 104. In another embodiment, the appliance 200 may reside on the client machine 102. In one embodiment, the client's request, such as the request 401, is received at the appliance 200 in response to a user accessing a portal page provided by the appliance 200. The request may include any type and form of content. In some embodiments, the URL request includes any number of URLs. In further embodiments, the URL request includes information about the user on the client 102. In still further embodiments, the URL request includes information about the client 102, such as security level of client's network connection, security features of the client, user features or any other type and form of information relating the client. In further embodiments, the URL request includes information about the server 106 from whom the client 102 is requesting access to information, service or resources.

The appliance 200 may determine (step 515) via policy provided by a policy engine 236 whether to provide clientless or client based access to SSL VPN. The clientless or client based SSL VPN session may be a session between the client 102 and server 106 via appliance 200, between a client 102 and appliance 200, or between appliance 200 and server 106. In one embodiment, the clientless policies 405 provided by the policy engine 236 are configurable. In one embodiment, the client based policies 410 provided by the policy engine 236 are configurable. In another embodiment, the policy determining whether to give clientless or client based access can also be configured. In one embodiment, the determination can be done based on a part of the request 401. In another embodiment, the determination to provide clientless access is done if the client does not have permission or resources to support client based access. In still another embodiment, the appliance always determines to provide clientless access. In yet another embodiment, the determination between clientless and client based access is done based on one or more of the following: a network packet of the request 401, a network condition, operating system of the client and version thereof, a firewall, anti virus software running on the client and the browser of the client. In some embodiments, appliance 200 identifies a session policy that indicates whether to establish a client based or clientless SSL VPN session based on the application requested by the client 102. In further embodiments, the appliance identifies a session policy that indicates whether to establish a client based or clientless SSL VPN session based on a URL from the request of the client 102. The URL used for identifying the session policy may be detected and identified by an access profile 415, or RegEx of an access profile 415. In some embodiments, appliance 200 identifies a session policy that indicates whether to establish a client based or clientless SSL VPN session based on the user on the client 102. The user on the client 102 may have special privileges or constraints that appliance 200 recognizes and identifies for the user a session policy for client based or via clientless SSL VPN sessions depending on such configuration. In some embodiments, appliance 200 identifies a session policy that indicates whether to establish a client based or clientless SSL VPN session based on an information relating the client 102. In some embodiments, the information may include identification of the client 102, such as an internet protocol (IP) address, a hostname, a name of the network via which the client 102 sends the request, a name of the client 102's internet provider, or any other client 102 related information. In some embodiments, appliance 200 identifies a session policy that indicates whether to establish a client based or clientless SSL VPN session based on the server identified by the request of the client 102. In yet further embodiments, appliance 200 identifies a session policy that indicates whether to establish a client based or clientless SSL VPN session based on a type of the resource or service of the server 106 requested by the client 102. In still further embodiments, appliance 200 identifies a session policy that indicates whether to establish a client based or clientless SSL VPN session based on the specific resource or service of the server 106 requested by the client 102.

In some embodiments, an access profile 415 is associated with the request 401. In one embodiment, the policy engine 236 determines (step 520) which access profile should be invoked for a request 401. The access profile 415 may be invoked based on the identification of the session policy or based on the request of the client 102. In one embodiment, the determination is based on a part of the request 401. For example, the appliance 200 determines from a header and/or a portion of a body of the request the policy 405 or 410 to use and/or the access profiles 415 to use. In some embodiments, an access profile 415 is identified based on a RegEx of the access profile 415. In further embodiments, a RegEx of an access profile 415 is matched to a URL or a portion of the URL from the client's request, and in response to the match, the access profile 415 of the matched RegEx is identified. In another embodiment, determination of the access profile is based on the application 420 requested by the URL request 401. In still another embodiment, the policy engine determines to invoke more than one access profiles 415 for a request 401. In one embodiment, the access profile 415 provides rewrite policies to the rewriter 430. In another embodiment, the access profile provides policies of parsing the request to detect URLs. In some embodiments, there is an in-built default profile. In one of these embodiments, the default profile is selected if the access policies do not select any other profile.

In one embodiment, the URL rewriter residing on the appliance 200 rewrites (step 525) URLs as dictated by the policy engine. In another embodiment, the rewrite policies are present in the access profiles 415. The rewrite policy may be a part of an access profile 415 that is identified by matching a RegEx to URL or a portion of the URL of the client's request. In still another embodiment, rewrite policies are present in the policy engine as a separate entity. In some embodiments, rewrite policies specify what type of content is to be rewritten. The content type may be generally referred to as transform type. In one embodiment, the transform type is a URL. In another embodiment, the transform type is text. In still another embodiment, the transform type is a http request (http_req). In yet another embodiment, the transform type is a http response (http_res). In one embodiment, rewrite policies can be added to existing ones using a CLI command such as the following:

add rewrite policylabel <labelName><transform>

In another embodiment, rewrite actions can be specified with more granularity using a CLI command such as the following:

```
add rewrite action <action-name> clientless_vpn_encode/
clientless_vpn_decode/clientless_vpn_encode_all/
clientless_vpn_decode_all <target>
```

The appliance 200 forwards (step 530) the modified request to the server 106. In one embodiment, the appliance 200 forwards the modified request to the server 106 over a network 104' which may or may not be substantially same as the network 104 between the client and the appliance. In another embodiment, the appliance 200 forwards the modified request via one or more intermediate appliances 200' (not shown).

Figure 6:
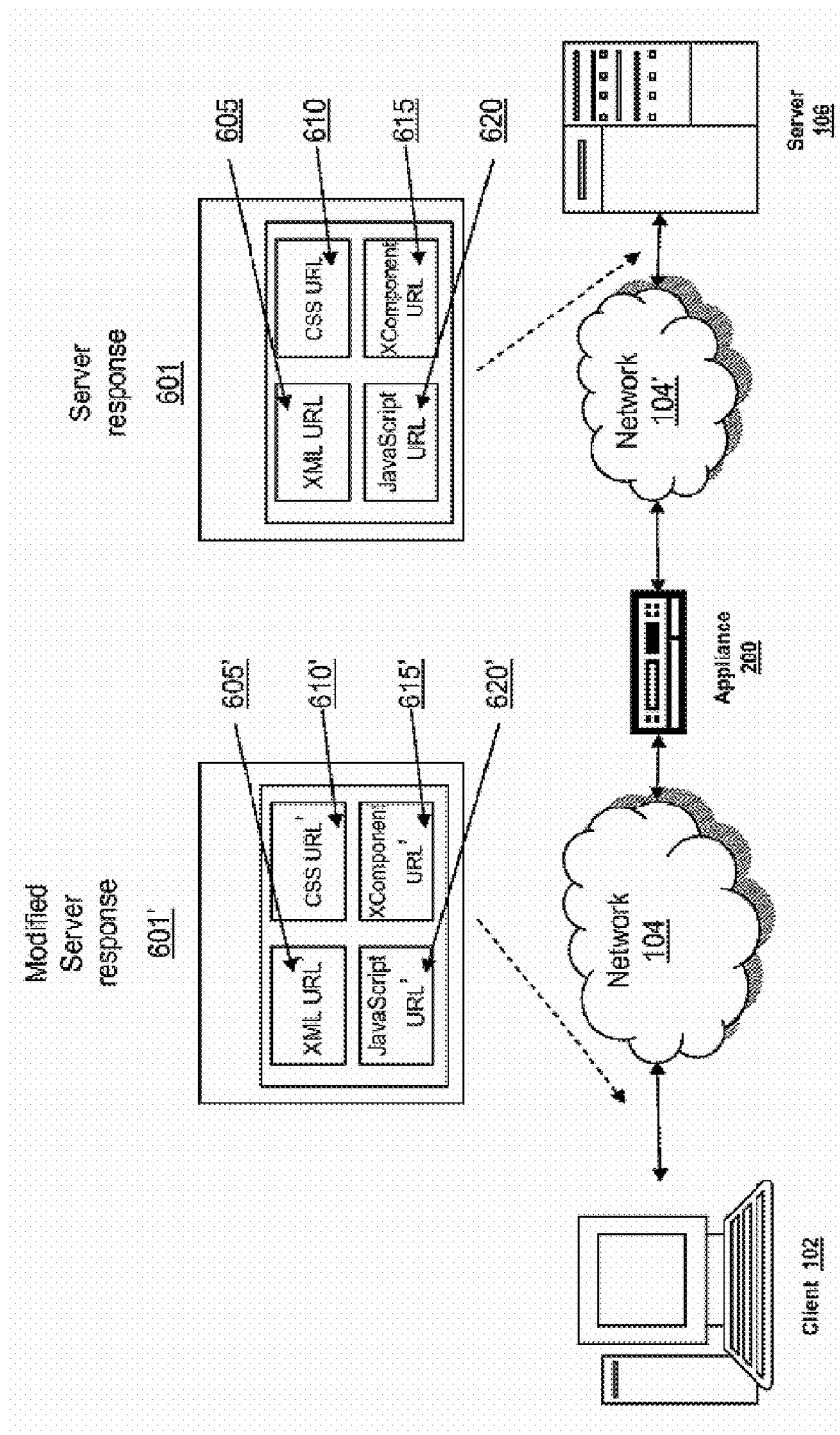
FIG. 6 is a block diagram of embodiments of a server response and a modified server response transmitted from a server to a client through an appliance.

Referring now to FIG. 6, a block diagram depicting embodiments of a server response and a modified server response transmitted from a server to a client through an appliance is shown. In brief overview, a server response 601 is transmitted from the server 106 to the appliance 200 via a network 104'. The appliance 200 modifies the server response 601 by rewriting URLs in the server response 601. A modified response 601' is then transmitted to the client 102 via a network 104.

The server response 601 is transmitted from the server 106 responsive to the server 106 receiving the modified request 401' (not shown) from the appliance 200. The server response 601 may be any response to any client 102 transmission or request. In some embodiments, server response 601 is a response to request 401. The server response 601 may comprise one or more of the following resources: static images, animated images, audio files and video files. In one of these embodiments, the static image is a raster graphic format such as GIF, JPEG or PNG. In another of these embodiments, the static image is a vector format such as SVG Flash. In still another embodiment, the animated image is an animated GIF image, a Java applet or a Shockwave image. In yet another embodiment, the audio file may be of one of a plurality of formats including MIDI, WAV, M3U and MP3. In another embodiment, the video file may be of one of a plurality of formats including WMV, RM, FLV, MPG and MOV. In one embodiment, the server response 601 may comprise interactive text, illustrations and buttons. In some embodiments the one or more resources of the server response 601 are identified by URLs. In one embodiment, on or more URLs 605 is created using a markup language such as XML, HTML or XHTML. In another embodiment, one or more URLs 610 in the server response 601 comprises a cascading style sheet (CSS) and metadata. In still another embodiment, one or more URLs 620 in the server response 601 comprises a script such as JavaScript or AJAX. In yet another embodiment, one or more URLs (615) in the server response 601 comprises components (Xcomponents) written using an user interface (UI) language.

The appliance 200 identifies the various URLs 605, 610, 615, 620 in the server response 601 and rewrites, modifies or transforms the URLs in accordance to rewrite policies specified by the policy engine 236 such as via the access profile. The various URLs in the server response 601 may be identified or detected using Regular Expressions that may be matched to the portions of any of the various URLs. In one embodiment, the modified server response 601' is then transmitted to the client 102 over the network 104. In another embodiment, the modified server response 601' comprises URL 605' created by modifying the markup language URL 605. In still another embodiment, the modified server response 601' comprises URL 610' created by modifying the CSS URL 610. In yet another embodiment, the modified response 601' includes a URL 615' created by modifying the Xcomponent URL 615. In another embodiment, the modified response 601' includes a URL 620' created by rewriting a JavaScript URL 620. In other embodiments, the modified response may include other components, script and objects as apparent to one skilled in the art. In one embodiment, the appliance 200 may inject content not present in the server response 601 into the modified response 601'. In another embodiment, the modified response 601' may be substantially same as the server response 601.

Figure 7:
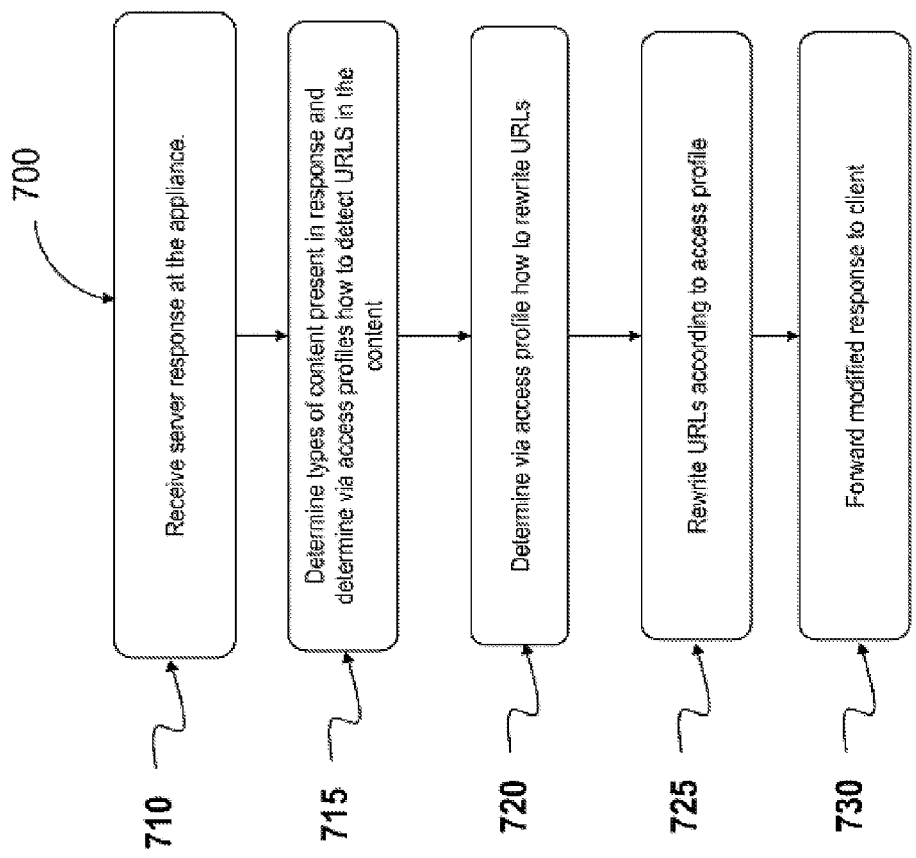
FIG. 7 is a flow diagram of steps of an embodiment of a method to perform URL rewriting on a server response.

Referring now to FIG. 7, a flow diagram depicting steps of an embodiment of a method for modifying or rewriting one or more URLs on a server response, by an appliance, is illustrated. The appliance 200 receives (step 710) the server response 601. The policy engine determines (step 715) the types of content present in the server response 601 and determines via access profiles 415 how to detect URLs in the content. The policy engine further determines (step 720) via access profile how to rewrite the URLs. The rewriter 430 rewrites (step 725) URLs and the appliance 200 forwards (step 730) modified response to the client 102.

In one embodiment, the server response 601 comprises different types of contents. In one embodiment, the server response includes contents created using a mark up language such as Extensible Markup Language (XML), Hypertext Markup Language (HTML) or Extensible HTML (XHTML). In another embodiment, the server response 601 includes a cascading style sheet (CSS) and metadata. In still another embodiment, the server response 601 includes a script such as JavaScript or AJAX. In yet another embodiment, the server response 601 comprises components (Xcomponents) written using an user interface (UI) language. In other embodiments, the server response may comprise files, objects, images, videos and interactive contents as apparent to one skilled in the art. In some embodiments, the server response 601 includes a server provided application requested by the client 102. In further embodiments, the server response 601 includes any resource or service requested by the client 102.

In one embodiment, the server response 601 is received (step 710) at the appliance over a network 104'. In another embodiment, the server response 601 comprises one or more resources identified by one or more URLs. The server response may include one or more of a plurality of resources as described in details with reference to FIG. 6.

The appliance 200, in communication with the policy engine 236, determines (step 715) the type of content present in the response 601. In one embodiment, the determination is done by parsing the response and detecting the presence of a type of content. In another embodiment, the determination is done by matching a search string pattern class (patclass) with the response 601. In one embodiment, the appliance 200 detects the presence of embedded URLs in the determined content types. In another embodiment, URL detection is done via a set of key combinations known as Regular Expressions (RegEx) to facilitate variety of control over the search string. In some embodiments, the RegEx are embedded inside the clientless access profile 415. RegEx may include any combination of any characters, numbers and symbols that may be used for matching with any section of server content to detect or identify one or more URLs. In one embodiment, the access profile 415 comprises a RegEx for detecting URL in JavaScript. In another embodiment, the access profile 415 comprises a RegEx for detecting URL in CSS. In still another embodiment, the access profile 415 comprises a RegEx for detecting URL in an Xcomponent. In yet another embodiment, the access profile 415 includes a RegEx for detecting URL in a markup language such as XML. Access profile 415 may include one or more RegEx and rewrite policies for detecting or identifying specific URLs and rewriting or modifying the identified specific URLs. In one embodiment a RegEx can be specified inside an access profile 415 using a CLI command such as the following:

[-RegexForFindingURLinJavaScript<string>]

In some embodiments, the user may define rules to detect URLs in contents not identified by the appliance. In other embodiments, the user may specify a RegEx to detect URL within an identified content type.

The rewriter 430 may rewrite the detected or identified URLs (step 725) in accordance to a policy specified by the policy engine 236. In some embodiments, the rewriter 430 uses one or more rewrite policies from the access profile 415 to rewrite the URLs detected or identified via RegExs from access profiles 415. In one embodiment, the rewrite policy is embedded in an access profile 415. In another embodiment, a rewrite policy for the response may be different from a rewrite policy for the request. In still another embodiment, the rewrite policies for the response and the request may be substantially same. In yet another embodiment, the body of the response 601 is parsed by an application programming interface such as AppFW 290. In one embodiment, the policies governing the rewrite are added to the policy engine 236 by using a CLI command such as the following:

Add rewrite PolicyLabel <string>]

In another embodiment, the policy engine specifies to the rewriter 430 to pass certain URLs without rewriting. In still another embodiment fine granularity can be provided by logically grouping a plurality of conditions in a rewrite policy. By way of example, a fine grained rewrite policy may be represented by a CLI command such as the following:

```
add rewrite policy ns_cvpn_default_abs_url_pol
'(url.startswith("http://") || url.startswith("https://")) &&
!url.hostname.server.startswith("schemas.") &&
!url.hostname.domain.-
contains_any("ns_cvpn_default_bypass_domain")'
ns_cvpn_default_Url_encode_act
```

In this example, the policy ns_cvpn_default_abs_url_pol is used to rewrite all the absolute URLs in which server name is not "schemas" and domain does not match with any of the domains specified in ns_cvpn_default_bypass_domain patclass. In some embodiments, rewriting is performed at the client 102. In one of these embodiments, the appliance 200 inserts JavaScript code in the modified response 601' to be executed at the client 102'. In another of these embodiments, client side rewriting is invoked for parts of the response that the appliance 200 cannot recognize as URL. In still other embodiments, the rewrite policies can be configured to handle compressed content in the server response 601.

Some CLI commands are described next by way of examples. In one embodiment, an administrator can specify how to identify an application such as OWA 2007 using a CLI command such as the following:

```
add vpn clientlessAccessPolicy owa_2007_pol
'http.req.url.path.get(1).eq("owa2007")' ns_cvpn_owa_profile
```

In another embodiment, this policy can be activated globally by binding it to vpn global using a CLI command such as the following:

bind vpn global-policy owa_2007_pol-priority 10

In one embodiment, there will be an in-built profile ns_cvpn_owa_profile for Outlook Web Access and same profile will work for OWA 2003 & OWA 2007. In another embodiment, there will be a default clientless access policy ns_cvpn_owa_policy which will select the OWA profile if default URLs (/exchange, /owa, /exchweb & /public) are used to provide Outlook Web Access. In still another embodiment, there will be an in-built generic profile for clientless access ns_cvpn_default_profile, this profile will be selected if none of the other clientless access policies select any other profile. This default profile will enable clientless access to any website which uses standard HTML and does not create URLs using JavaScript.

The appliance 200 may forward (step 730) the modified response 601' to the client 102. In some embodiments, appliance 200 forwards any number of modified responses 601' to any number of clients 102. In further embodiments, appliance 200 forwards server response 601 to the client. In still further embodiments, appliance 200 forwards to the client 102 the modified response 601' which was modified or transformed to include all of the content of the server response 601 with changes or modifications to the specific URLs, such as URLs 605, 610, 615 and 620, for example. The content of the modified response 601' may include any portions of the response 601 along with modified URLs which were identified or detected using one or more RegExs and modified or rewritten using rewrite policies of the access profiles 415.

We claim:

1. A method for establishing, via policy, a clientless secure socket layer virtual private network (SSL VPN) session between a client and a server, the method comprising:
    a) receiving, by an intermediary, a request from a client to access a server, the intermediary establishing SSL VPN sessions between clients and the server,
    b) identifying, by the intermediary, a session policy based on the request, the session policy indicating whether to establish a client based SSL VPN session or clientless SSL VPN session with the server;
    c) determining, by the intermediary responsive to the session policy, to establish a clientless SSL VPN session between the client and the server; and
    d) identifying, by the intermediary responsive to the establishment of the clientless SSL VPN session, a first access profile for the clientless SSL VPN session from a plurality of access profiles for controlling access via the clientless SSL VPN session, the first access profile (i) specifying one or more rewrite policies for modifying content from the server and (ii) identified based on at least one of: a user of the client and an application providing the content.

2. The method of claim 1, comprising establishing, by the intermediary responsive to the determination, the clientless SSL VPN session with the server.

3. The method of claim 1, wherein step (a) further comprising receiving, by the intermediary, the request from the client to access an application on the server and wherein step (b) further comprises the session policy indicating whether to establish the client based or clientless SSL VPN session with the server based on the application.

4. The method of claim 3, wherein the access profile specifies one or more rewrite policies for the application.

5. The method of claim 1, wherein step (a) further comprises receiving, by the intermediary, the request from a user to access the server and wherein step (b) further comprises the session policy indicating whether to establish the client based or clientless SSL VPN session with the server based on the user.

6. The method of claim 1, wherein step (c) further comprises identifying, by the intermediary, the first access profile for establishing the clientless SSL VPN session, the first access profile specifying the one or more rewrite policies.

7. The method of claim 1, wherein step (c) further comprises identifying the first access profile, the one or more rewrite policies of the first access profile configured differently from one or more rewrite policies of a second access profile of the plurality of access profiles.

8. The method of claim 1, wherein step (c) further comprises identifying, responsive to one or more policies, the first access profile from the plurality of access profiles for controlling access via the clientless SSL VPN session.

9. The method of claim 1, further comprising identifying the first access profile based on one or more of the following: information about the client, and the server identified by the request.

10. The method of claim 1, wherein step (c) further comprises identifying the first access profile comprising a first rewrite policy for rewriting a uniform resource locator in a first specified type of content from the server and a second rewrite policy for rewriting a uniform resource locator in a second specified type of content from the server.

11. An intermediary for establishing via policy a clientless secure socket layer virtual private network (SSL VPN) session between a client and a server, the intermediary comprising:
- a packet engine executing on a hardware processor, for receiving a request from a client to access a server, the intermediary establishing SSL VPN sessions between clients and the server,
- a policy engine for identifying a session policy based on the request, the session policy indicating whether to establish a client based SSL VPN session or clientless SSL VPN session with the server; and
- wherein the intermediary determines responsive to the session policy to establish a clientless SSL VPN session between the client and the server, and identifies, responsive to the establishment of the clientless SSL VPN session, a first access profile for the clientless SSL VPN session from a plurality of access profiles for controlling access via the clientless SSL VPN session, the access profile (i) specifying one or more rewrite policies for modifying content from the server and (ii) identified based on at least one of: a user of the client and an application providing the content.

12. The intermediary of claim 11, wherein the intermediary establishes, responsive to the determination, the clientless SSL VPN session with the server.

13. The intermediary of claim 11, further comprising the packet engine receiving the request from the client to access an application on the server and the session policy indicating whether to establish the client based or clientless SSL VPN session with the server based on the application.

14. The intermediary of claim 11, further comprising the policy engine responsive to one or more policies identifying an access profile for controlling access via the clientless SSL VPN session, the access profile specifying one or more rewrite policies for the application.

15. The intermediary of claim 11, further comprising the packet engine receiving the request from a user to access the server and the session policy indicating whether to establish the client based or clientless SSL VPN session with the server based on the user.

16. The intermediary of claim 11, further comprising the policy engine identifying an access profile for controlling access to the clientless SSL VPN session, the access profile specifying one or more rewrite policies.

17. The intermediary of claim 11, further comprising the policy engine identifying the first access profile, the one or more rewrite policies of the first access profile configured differently from one or more rewrite policies of a second access profile of the plurality of access profiles.

18. The intermediary of claim 11, further comprising the policy engine identifying, responsive to one or more policies, a first access profile from a plurality of access profiles for controlling access via the clientless SSL VPN session.

19. The intermediary of claim 11, further comprising the policy engine identifying the first access profile based on one or more of the following: information about the client, and the server identified by the request.

20. An intermediary for establishing via policy a clientless secure socket layer virtual private network (SSL VPN) session between a client and a server, the intermediary comprising:
- means for receiving a request from a client to access a server, the intermediary establishing SSL VPN sessions between clients and the server,
- means for identifying a session policy based on the request, the session policy indicating whether to establish a client based or clientless SSL VPN session with the server;
- means for determining, responsive to the session policy, to establish a clientless SSL VPN session between the client and the server; and
- means for identifying, by the intermediary responsive to the establishment of the clientless SSL VPN session, a first access profile for the clientless SSL VPN session from a plurality of access profiles for controlling access via the clientless SSL VPN session, the first access profile (i) specifying one or more rewrite policies for modifying content from the server, and (ii) identified based on at least one of: a user of the client and an application providing the content.

21. The intermediary of claim 20, further comprising means for establishing, responsive to the determination, one of the client based or the clientless SSL VPN session with the server.

* * * * *